US012330170B2

(12) United States Patent
Rinne

(10) Patent No.: US 12,330,170 B2
(45) Date of Patent: Jun. 17, 2025

(54) FROTH FLOTATION CELL

(71) Applicant: OUTOTEC (FINLAND) OY, Espoo (FI)

(72) Inventor: Antti Rinne, Espoo (FI)

(73) Assignee: OUTOTEC (FINLAND) OY, Espoo (FI)

( * ) Notice: Subject to any disclaimer, the term of this patent is extended or adjusted under 35 U.S.C. 154(b) by 962 days.

(21) Appl. No.: 17/007,878

(22) Filed: Aug. 31, 2020

(65) Prior Publication Data

US 2020/0391225 A1 Dec. 17, 2020

Related U.S. Application Data

(63) Continuation of application No. PCT/FI2018/050156, filed on Mar. 2, 2018.

(51) Int. Cl.
*B03D 1/14* (2006.01)
*B03D 1/08* (2006.01)
*B03D 1/16* (2006.01)

(52) U.S. Cl.
CPC ........... *B03D 1/1462* (2013.01); *B03D 1/082* (2013.01); *B03D 1/16* (2013.01); *B03D 1/1412* (2013.01)

(58) Field of Classification Search
None
See application file for complete search history.

(56) References Cited

U.S. PATENT DOCUMENTS 1,310,051 A 7/1919 Blomfield
3,342,331 A 9/1967 Maxwell
3,701,421 A * 10/1972 Maxwell .............. B03D 1/1406 209/164
4,566,968 A * 1/1986 Kivisto .................. B03D 1/028 210/221.1
5,251,764 A * 10/1993 Niitti ........................ B03D 1/16 261/87

(Continued)

FOREIGN PATENT DOCUMENTS

CN 203380005 U 1/2014
EP 3758850 A1 1/2021

(Continued)

OTHER PUBLICATIONS

J.B. Yianatos, F.H. Henriquez, A.G. Oroz, Minerals Engineering, Oct. 21, 2005, Science Direct, 19, 531-538 (Year: 2006).*

(Continued)

*Primary Examiner* — Jonathan M Peo

(74) *Attorney, Agent, or Firm* — Robert P. Michal, Esq.; Carter, DeLuca & Farrell LLP

(57) ABSTRACT

A froth flotation cell for treating mineral ore particles suspended in slurry includes a tank, a gas supply, a first froth collection channel, a second froth collection channel arranged between the centre of the tank and the first froth collection channel, and a radial froth collection launder including a radial froth overflow lip, and extending from the first froth collection channel towards the second froth collection channel. The froth flotation cell further includes a radial froth crowder including a crowding sidewall, and extending from the second froth collection channel to the first froth collection channel. Further, a froth flotation line, its use and a froth flotation method are presented.

52 Claims, 11 Drawing Sheets

(56) References Cited

U.S. PATENT DOCUMENTS

| | | | | |
|---|---|---|---|---|
| 5,611,917 A * | 3/1997 | Degner | B03D 1/1412 | 209/168 |
| 6,095,336 A * | 8/2000 | Redden | B03D 1/1481 | 209/168 |
| 2008/0149536 A1* | 6/2008 | Ronkainen | B03D 1/02 | 209/163 |
| 2020/0391225 A1 | 12/2020 | Rinne | | |

FOREIGN PATENT DOCUMENTS

| | | | |
|---|---|---|---|
| WO | WO-9320945 A1 * | 10/1993 | B03D 1/082 |
| WO | 2009115348 A1 | 9/2009 | |
| WO | 2019166687 A1 | 9/2019 | |

OTHER PUBLICATIONS

Search Report issued by the Chile Patent Office in relation to Chile Application No. 202002219 dated Feb. 2, 2022 (3 pages).

International Search Report issued by the Finnish Patent and Registration Office acting as the International Searching Authority in relation to International Application No. PCT/FI2018/050156 dated Jul. 3, 2018 (5 pages).

Written Opinion of the International Searching Authority issued by the Finnish Patent and Registration Office acting as the International Searching Authority in relation to International Application No. PCT/FI2018/050156 dated Jul. 3, 2018 7 pages).

International Preliminary Report on Patentability issued by the European Patent Office acting as the International Preliminary Examining Authority in relation to International Application No. PCT/FI2018/050156 dated May 27, 2020 (10 pages).

Extended European Search Report issued by the European Patent Office in relation to European Application No. 18811323.7 dated Sep. 24, 2021 (9 pages).

Office Action issued by the Canadian Intellectual Property Office in relation to Canandian Application No. 3,092,646 dated May 17, 2024 (3 pages).

* cited by examiner

FROTH FLOTATION CELL

CROSS-REFERENCE TO RELATED APPLICATIONS

This application is a continuation of PCT International Application No. PCT/FI2018/050156 filed Mar. 2, 2018, which published as WO2019/166687 on Sep. 6, 2019, the disclosure of this application which is expressly incorporated herein by reference in its entirety.

FIELD OF THE INVENTION

The present invention relates to a froth flotation cell for treating mineral ore particles suspended in slurry and for separating the slurry into an underflow and an overflow, a froth flotation line, its use and a froth flotation method.

SUMMARY OF THE INVENTION

A froth flotation cell is provided for recovering valuable metal containing ore particles from ore particles suspended in slurry and for separating the slurry into an underflow and an overflow. The froth flotation cell comprises a tank with a centre and a perimeter, a gas supply for introducing flotation gas into the slurry to form froth, a first froth collection channel surrounding the perimeter of the tank so that an open froth surface is formed inside the first froth collection channel, a second froth collection channel arranged between the centre of the tank and the first froth collection channel and substantially concentric with the first froth collection channel, the second froth collection launder comprising a first froth overflow lip facing towards the centre of the tank, and a radial froth collection launder comprising a radial froth overflow lip and extending from the first froth collection channel towards the second froth collection channel and in fluid communication with the first froth collection channel. The froth flotation cell has a pulp area of at least 15 $m^2$, measured at a mixing area. Froth collected into the second froth collection channel is arranged to be directed to the first froth collection channel. The froth flotation cell is characterized in that it further comprises a radial froth crowder comprising a crowding sidewall and extending from the second froth collection channel to the first froth collection channel.

The flotation line according to the invention comprises a rougher part with at least two rougher flotation cells connected in series and arranged in fluid communication, and a scavenger part with at least two scavenger flotation cells connected in series and arranged in fluid communication. In the flotation line, a subsequent flotation cell is arranged to receive underflow from a previous flotation cell. The flotation line is characterized in that at least one of the flotation cells is a froth flotation cell according the present disclosure.

The use of a froth flotation line according to the present invention is intended to be employed in recovering mineral ore particles comprising a valuable mineral.

The froth flotation method for treating mineral ore particles suspended in slurry comprises separating the slurry into an underflow and an overflow in a froth flotation cell according to the present disclosure. The method is characterized in that an open froth surface of a flotation tank is divided into two open froth subsurfaces by a radial froth crowder arranged between a first radial overflow lip of a first radial froth collection launder and a second radial overflow lip of a second radial froth collection launder.

By using the invention described herein, it may be possible to direct so-called "brittle froth", i.e. a loosely textured froth layer comprising generally larger flotation gas bubbles agglomerated with the mineral ore particles intended for recovery, more efficiently and reliably towards the froth overflow lip and froth collection launder. A brittle froth can be easily broken, as the gas bubble-ore particle agglomerates are less stable and have a reduced tenacity. Such froth or froth layer cannot easily sustain the transportation of ore particles, and especially coarser particles, towards the froth overflow lip for collection into the launder, therefore resulting in particle drop-back to the pulp or slurry within the flotation cell or tank, and reduced recovery of the desired material.

Brittle froth is typically associated with low mineralization, i.e. gas bubble-ore particle agglomerates with limited amount of ore particles comprising a desired valuable mineral that have been able to attach onto the gas bubbles during the flotation process within a flotation cell or tank. The problem is especially pronounced in large-sized flotation cells or flotation tanks with large volume and/or large diameter. While gathering the froth may become challenging for large flotation cells or tanks, they are nevertheless advantageous in increasing the delay and contacts between the gas and the particles.

With the invention at hand, it may be possible to crowd and direct the froth towards froth overflow lips, to reduce the froth transportation distance (thereby reducing the risk of drop-back), and, at the same time, maintain or even reduce the froth overflow lip length. In other words, the handling and directing of the froth layer in a froth flotation cell or tank may become more efficient and straightforward.

It may also be possible to improve froth recovery and thereby valuable mineral particle recovery in large flotation cells or tanks from brittle froth specifically in the later stages of a flotation line, for example in the rougher and/or scavenger stages of a flotation process.

Further, with the invention described herein, the area of froth on the surface of the slurry inside a flotation cell or tank may be decreased in a robust and simple mechanical manner. At the same time, the overall froth overflow lip length in a froth flotation cell may be decreased. Robust in this instance is to be taken to mean both structural simplicity and durability. By decreasing the froth surface area of a flotation cell by a froth crowder or a crowding side structure instead of adding extra froth collection launders, the froth flotation cell as a whole may be a simpler construction. The froth crowder may also simultaneously act as a channel directing collected overflow into further froth collection channels, or act as a fluid connection between two collection channels, thereby further eliminating the need to add more launders into the flotation cell. This may also allow for the launders to be smaller, narrower and simpler in construction. Hence, the use of a froth crowder may give more degree of freedom in designing froth collection arrangements for flotation cells without the need to influence the volume of the flotation cells.

Especially in the downstream end of a flotation line, the amount of desired valuable material that can be trapped into the froth within the slurry may be very low. This phenomenon may be especially pronounced in the flotation processes intended for recovering valuable material from low grade ores.

In order to collect the valuable material comprising ore particles from the froth layer to the froth collection launders, the froth surface area should be decreased. By arranging a froth crowder into a froth flotation cell in a movable manner, the open froth surfaces between the different froth overflow lips may be controlled. A froth crowder may be utilised to direct or guide the upwards-flowing slurry within the flotation tank closer to a froth overflow lip of a froth collection launder or collection channel, thereby enabling or easing froth formation very close to the froth overflow lip, which may increase the collection of valuable ore particles.

A froth crowder may also influence the overall convergence of flotation gas bubbles and/or gas bubble-ore particle agglomerates into the froth layer. For example, if the gas bubbles and/or gas bubble-ore particle agglomerates become directed towards the centre of a flotation tank, a froth crowder may be utilised to increase the froth area in the vicinity of or adjacent to any desired froth overflow lip.

With the invention described herein, the recovery of desired valuable ore particles in flotation may be increased. In other words, ore particles comprising very small or even minimal amounts of the desired material may be recovered for further processing/treatment. This may be especially beneficial for ores of poor quality, i.e. ores with very little valuable material initially, for example from poor mineral deposits which may have previously been considered economically too insignificant to justify utilization. For example, the recovery of copper ore, which becomes frothed easily, may be considerably improved with the invention described herein.

It may be possible to achieve a high recovery for the entire slurry stream passing through flotation. Especially in a downstream end of a flotation line, it may possible to increase the recovery of ore particles comprising the desired mineral.

In addition, it may be possible to improve the recovery of coarser ore particles, and recovery of valuable mineral material in situations where the mineralization of flotation gas bubbles may, for a reason, be less than ideal within the flotation process.

In this disclosure, the following definitions are used regarding the invention.

By a froth crowder herein is meant a froth blocker, a froth baffle, or a crowding board, or a crowding board device, or any other such structure or side structure, for example a sidewall, inclined or vertical, having a crowding effect, i.e. a crowding sidewall.

Flotation involves phenomena related to the relative buoyancy of objects. Flotation is a process for separating hydrophobic materials from hydrophilic materials by adding flotation gas, for example air or any other suitable gas, to the process. Flotation could be made based on natural hydrophobic/hydrophilic difference or based on hydrophobic/hydrophilic differences made by addition of a surfactant or collector chemical. Gas can be added to the feedstock subject of flotation (slurry or pulp) by a number of different ways.

Basically, flotation aims at recovering a concentrate of ore particles comprising a desired mineral. Typically, the desired mineral is a valuable mineral. By concentrate herein is meant the part of slurry recovered in an overflow or underflow led out of a flotation cell. By valuable mineral is meant any mineral, metal or other material of commercial value.

Flotation involves phenomena related to the relative buoyancy of objects. The term flotation includes all flotation techniques. Flotation can be for example froth flotation, dissolved air flotation (DAF), or induced gas flotation.

By a flotation line herein is meant an assembly comprising a number of flotation units or flotation cells that are arranged in fluid connection with each other for allowing either gravity-driven or pumped slurry flow between flotation cells, to form a flotation line. In a flotation line, a number of flotation cells are arranged in fluid connection with each other so that the underflow of each preceding flotation cell is directed to the following or subsequent flotation cell as a infeed until the last flotation cell of the flotation line, from which the underflow is directed out of the line as tailings or reject flow.

The flotation line is meant for treating mineral ore particles suspended in slurry by flotation. Thus, ore particles comprising valuable metal or mineral, or any desired mineral, are recovered from ore particles suspended in slurry. For example, the desired mineral may be a valuable metal contained by the ore particles. In other instances, the desired mineral may also be the non-valuable part of the slurry, such as silicate in reverse flotation of iron.

Slurry is fed through a feed inlet to the first flotation cell of the flotation line for initiating the flotation process. Flotation line may be a part of a larger flotation plant containing one or more flotation lines. Therefore, a number of different pre-treatment and post-treatment devices may be in operational connection with the components of the flotation line, as is known to the person skilled in the art.

By flotation cell (or unit) herein is meant a part of the flotation line comprising one or more flotation tanks. A flotation tank is typically cylindrical in shape, the shape defined by an outer wall or outer walls. The flotation cells regularly have a circular cross-section. The flotation tanks may have a polygonal, such as rectangular, square, triangular, hexagonal or pentagonal, or otherwise radially symmetrical cross-section, as well. The number of flotation cells may vary according to a specific flotation line and/or operation for treating a specific type and/or grade of ore, as is known to a person skilled in the art.

The flotation cell may be a froth flotation cell, such as a mechanically agitated cell or tank cell, a column flotation cell, a Jameson cell, or a dual flotation cell. In a dual flotation cell, the cell comprises at least two separate vessels, a first mechanically agitated pressure vessel with a mixer and a flotation gas input, and a second vessel with a tailings output and an overflow froth discharge, arranged to receive the agitated slurry from the first vessel. The flotation cell may also be a fluidized bed flotation cell, wherein air or other flotation gas bubbles which are dispersed by the fluidization system percolate through the hindered-setting zone and attach to the hydrophobic component altering its density and rendering it sufficiently buoyant to float and be recovered. In a fluidized bed flotation cell axial mixing is not needed. The flotation cell may also be of a type where a mechanical flotation cell (i.e. a flotation cell comprising a mechanical agitator or mixer) comprises a microbubble generator for generating microbubbles into the slurry within the flotation cell. The size distribution of microbubbles is smaller than that of the conventional flotation gas bubbles introduced by the mixer or by other gas introduction system which typically fall into a size range of 0.8-2 mm. The size range of microbubbles may be 1-1.2 mm. Microbubbles may be introduced by a microbubble generator comprising a slurry recirculation system, or a direct sparger system.

Depending on its type, the flotation cell may comprise a mixer for agitating the slurry to keep it in suspension. By a mixer is herein meant any suitable means for agitating slurry within the flotation cell. The mixer may be a mechanical agitator. The mechanical agitator may comprise a rotor-stator with a motor and a drive shaft, the rotor-stator construction arranged at the bottom part of the flotation cell. The cell may have auxiliary agitators arranged higher up in the vertical direction of the cell, to ensure a sufficiently strong and continuous upwards flow of the slurry. The mixer may comprise for example a “Wemco” pump type agitator which at the same time acts as a gas supply into the tank by drawing air from the surface of the slurry in the tank by rotational force of the pump and feeding this air into the slurry within the tank, or any similar device in a self-aspirating or self-aerated flotation cell or flotation tank.

By overflow herein is meant the part of the slurry collected into the launder of the flotation cell and thus leaving the flotation cell. The overflow may comprise froth, froth and slurry, or in certain cases, only or for the largest part slurry. In some embodiments, the overflow may be an accept flow containing the valuable material particles collected from the slurry. In other embodiments, the overflow may be a reject flow. This is the case in when the flotation process is utilized in reverse flotation.

By underflow herein is meant the fraction or part of the slurry which is not floated into the surface of the slurry in the flotation process. In some embodiments the underflow may be a reject flow leaving a flotation cell via an outlet which typically is arranged in the lower part of the flotation tank. Eventually the underflow from the final flotation cell of a flotation line or a flotation plant may leave the entire flotation line as a tailings flow or final residue.

In some embodiments, the underflow may be an accept flow containing the valuable mineral particles. This is the case in when the flotation line and/or method is utilized in reverse flotation. For example, in reverse flotation of iron (Fe), silicates are floated and collected from the froth layer, while the desired concentrate (Fe) is collected from the underflow or tailings flow. In order to reach a silicate content of less than 1.5% by weight in the Fe concentrate the last flotation cells or flotation stages of such a reverse flotation process may be difficult to operate in an optimal manner due to the low amount of froth, brittle froth, and/or low mineralization of the froth. With the invention described herein, this problem may be alleviated.

By downstream herein is meant the direction concurrent with the flow of slurry (forward current, denoted in the figures with arrows), and by upstream herein is meant the direction counter-current with or against the flow of slurry.

By pulp area herein is meant the effective open area of the flotation cell or tank available for froth formation, as measured in the flotation tank at the height of a mixing area, i.e. the part or zone of the flotation tank in vertical direction where the slurry is agitated or otherwise induced to mix the ore particles suspended in the slurry with the flotation gas bubbles. Depending on the type of the flotation cell and/or the flotation tank, this mixing area is variable.

For example, in a flotation cell or flotation tank comprising a rotor, the mixing area is defined as the mean cross-sectional area of the tank at the rotor height. For example, in a flotation cell where the gas supply into the slurry is arranged into a pre-treatment tank prior to leading the slurry into the flotation tank, i.e. in a dual flotation tank, the mixing area is the cross-sectional area at the slurry inlet height. For example, in a flotation cell where gas is supplied via spargers (i.e. a column flotation cell), the mixing area is defined as the cross-sectional area of the tank at the sparger height.

In an embodiment of the froth flotation cell, the radial froth collection launder comprises a first radial froth overflow lip and a second radial froth overflow lip opposite the first radial froth overflow lip.

In an embodiment of the froth flotation cell, at least one radial froth overflow lip is arranged to face a crowding sidewall of a radial froth crowder.

In an embodiment of the froth flotation cell, a radial froth collection launder comprises a sidewall which is a crowding sidewall.

In an embodiment of the froth flotation cell, a radial froth crowder comprises a crowding sidewall and a froth collection lip opposite the crowding sidewall, and the froth collection lip is arranged to face a crowding sidewall of a radial froth collection launder.

It is conceivable that both the radial froth collection launder and the radial froth crowder have similar construction and form, to simplify the design of the froth flotation cell, as well as make its manufacturing and construction simpler and easier. Therefore it is foreseeable that both the launder and the crowder structures may act as collecting structures and/or as crowding structures. This is made possible by the arrangement of their sidewalls and lip structures. A crowding structure (a crowding wall or sidewall) extends sufficiently high above the froth layer of the froth flotation cell so that froth overflow is prevented, while a launder lip or a froth collection lip is arranged to allow overflow of slurry and/or froth into the structure to which it belongs. As a result, it is possible to reduce the open froth surface in relation to the lip length, thereby improving the efficiency of recovery in the froth flotation cell.

When the radial froth collection launder comprises a radial froth overflow lip and the radial froth crowder comprises a crowding sidewall, or the radial froth collection launder comprises a first and a second overflow lip and the radial froth crowder comprises two crowding sidewalls, the open froth surfaces created between the froth overflow lips and the crowding sidewalls are identical, and the open froth surface areas are constrained by those structures. Further, by arranging at least some of the radial froth collection launders and the radial froth crowders to comprise a crowding sidewall or other crowding structure, the lip length of the froth flotation cell may be effectively reduced at the same time as recovery of valuable mineral ore particles may be improved or maintained at a high level.

In an embodiment of the froth flotation cell, a radial froth crowder comprises a first crowding sidewall and a second crowding sidewall.

In a construction where the radial froth collection launder is arranged to comprise a first and a second radial froth overflow lips and the radial froth crowder is arranged to comprise a first crowding sidewall and a second crowding sidewall, the radial froth collection launders can be formed as light structures that have a minimal effect on the volume of the froth flotation cell or tank, or on the open froth surfaces of the froth flotation cell or tank.

In an embodiment of the froth flotation cell, it comprises radial froth collection launders and/or radial froth crowders arranged so that the open froth surfaces formed between each radial froth collection launder and/or radial froth crowder are identical in surface area.

In an embodiment of the froth flotation cell, the first froth collection channel comprises a first froth overflow lip facing towards the centre of the tank.

In a further embodiment of the froth flotation cell, the first froth overflow lip is arranged at the top of a vertical sidewall of the first froth collection channel.

In other words, the first froth collection channel may be arranged to act as a froth collection launder. By arranging a vertical sidewall for the froth collection channel, it may be possible to ensure that froth is efficiently directed into the froth collection channel, over the froth overflow lip of the channel. A vertical sidewall may allow froth to rise uninhibited adjacent to the froth collection channel until it reaches the froth overflow lip, with the upwards flow of slurry in the flotation tank, thereby ensuring that as much of the valuable material comprising ore particles are recovered with the overflow of froth into the froth collection channel.

In yet another embodiment of the froth flotation cell, the first froth collection channel comprises a side structure facing towards the centre of the tank, the side structure arranged to crowd froth away from the first froth collection channel. This allows the length of the overflow lip to be decreased while at the same time reducing the froth area.

In a further embodiment of the froth flotation cell, the side structure has an angle of inclination of 20-80° in relation to the vertical of the tank.

This prevents flotation gas bubbles from colliding and combining, while the froth area may still be efficiently reduced. This is particularly advantageous, when the first froth collection channel comprises a side structure on its outside surface arranged to crowd froth away.

In other words, the first froth collection channel may be arranged to act as a froth crowder crowding the froth in the open froth surfaces towards other froth overflow lips of froth collection channels or launders. For a sufficient crowding action, the side structure may have an angle of inclination 20-40° or even 20-80°, preferably approximately 30° in relation the vertical of the flotation tank.

In an embodiment of the froth flotation cell, the second froth collection channel further comprises a second overflow lip facing towards the perimeter of the tank.

In a further embodiment of the froth flotation cell, the second overflow lip is arranged at the top of a vertical sidewall of the second froth collection channel.

In other words, the second froth collection channel may be arranged to collect froth from open froth areas adjacent to its both sides. By arranging a vertical sidewall for the froth collection channel, it may be possible to ensure that froth is efficiently directed into the froth collection channel, over the froth overflow lip of the channel. This kind of robust design is beneficial, as only one collecting piping for two overflow lips has to be arranged. Further, brittle froth may be more efficiently collected and directed out of the froth flotation cell as overflow.

In yet another embodiment of the froth flotation cell, the second froth collection channel further comprises a side structure facing towards the perimeter of the tank, the side structure arranged to crowd froth away from the second froth collection channel.

In a further embodiment of the froth flotation cell, the side structure has an angle of inclination of 20-80° in relation to the vertical of the tank.

In other words, the second froth collection channel may be arranged to act as a froth crowder crowding the froth in the open froth surfaces towards other froth overflow lips of froth collection channels or launders, and towards the tank perimeter. For a sufficient crowding action, the side structure may have an angle of inclination 20-40° or even 20-80°, preferably approximately 30° in relation the vertical of the flotation tank.

In an embodiment of the froth flotation cell, a radial froth collection launder is arranged to collect froth and direct the collected froth to the first froth collection channel.

In an embodiment of the froth flotation cell, a radial froth crowder is arranged in fluid communication with the first froth collection channel and the second froth collection channel, and further arranged to direct froth from the second froth collection channel to the first froth collection channel.

In this kind of construction, the flows of overflow material may be efficiently collected, as also a froth crowder may be arranged to direct and transport the material from the second froth collection channel to the first collection channel. At the same time, the radial launders may be smaller in size (narrower and/or shallower), and therefore have a light and simple construction.

In an embodiment of the froth flotation cell, a radial froth collection launder is arranged to have a shape that prevents flotation gas bubbles from colliding under the radial froth collection launder and froth from moving away from the radial froth collection launder.

In an embodiment of the froth flotation cell, a radial froth collection launder is arranged to have a shape that directs froth to flow into the radial froth collection launder.

In an embodiment of the froth flotation cell, the cross-section of a radial froth collection launder in the radial direction of the tank is substantially V shaped form comprising an apex pointing towards the bottom of the tank, a first inclined sidewall and a second inclined sidewall extending from the apex so that an apex angle $\alpha$ is formed between the first and the second inclined sidewalls, and a first radial froth overflow lip at the top of the first inclined sidewall and a second radial froth overflow lip at the top of the second inclined sidewall.

In this way, the volume of the froth flotation tank is minimally affected by the addition of one or more such radial froth collection launder, and the flotation process conditions may therefore be maintained despite the added structure.

In a yet another embodiment of the froth flotation cell, a radial froth collection launder comprises a vertically extending first sidewall and a vertical extending second sidewall opposite the first sidewall, a first radial froth overflow lip at the top of the first side and a second radial froth overflow lip at the top of the second side, and a substantially V shaped inclined bottom with an apex pointing towards a bottom of the tank and having an apex angle $\alpha$, the first and second sidewalls and the bottom defining a channel for directing froth to the first froth collection channel.

In a further embodiment of the froth flotation cell, the first sidewall and the second sidewall have a length of at least 50 mm.

By arranging a radial froth collection launder to have a specific form, i.e. either a simpler V shaped form with inclined sidewalls, or a form having vertical sidewalls and a V shaped bottom, it may be possible to prevent flotation gas bubbles from colliding into each other under the radial froth collection launder which may lead to gas bubble-ore particle agglomerates to disintegrate and ore particles to drop back towards the bottom of the tank, thereby negatively affecting the efficiency of the flotation process; or to prevent froth from moving away from under the radial froth collection launder towards the froth overflow lips.

Further, with the vertical sidewalls it may be possible to ensure that froth is efficiently directed into the radial froth collection launder, over the radial froth overflow lips of the launder. In addition, with a substantially V shaped bottom, a sufficient width may be arranged for the radial froth collection launder, thereby ensuring efficient directing and transportation of the collected froth and overflow within the channel defined by the sidewalls and the bottom.

In an embodiment of the froth flotation cell, an apex angle $\alpha$ of the V shaped bottom is 20-160°, preferably 20-80°.

In an embodiment of the froth flotation cell, a radial froth crowder is arranged to have a shape that directs froth towards the radial overflow lips of radial froth collection launders next to the radial froth crowder.

In an embodiment of the froth flotation cell, the cross-section of a radial froth crowder in the radial direction of the tank has a functional V shape comprising an apex pointing towards the bottom of the tank, and an inclined first side and an inclined second side extending from the apex so that an angle β is formed between the first and the second sides; the first side facing the first radial froth overflow lip of an adjacent first radial froth collection launder and the second side facing the second radial froth overflow lip of an adjacent second radial froth collection launder.

In a further embodiment of the froth flotation cell, the angle β is 20-80°.

By forming a radial froth crowder in the above-mentioned manner, the froth load on each side of the radial froth crowder may be easily and simply balanced and controlled, and the directing and/or crowding of froth, especially brittle froth, may be efficiently affected on both sides of the radial froth crowder.

By functional V shape herein is meant that the radial froth crowder may have a cross-section that is substantially V shaped. However, the outer edges of the radial froth crowder may not be completely even or straight. Due to, for example, manufacturing factors, the shape may be more organic, the edges may be wavy, lumpy or in other ways uneven. This, however, does not affect the functionality of the radial froth crowder, as its basic form is, as described herein, a V shape with two distinct inclined sides, an apex and an open top opposite the apex. The functional V shape and its parts as described here, is utilised herein to describe the basic shape of the radial froth crowder. The functional V shape may also be understood as a isosceles triangle standing on its vertex point, and having a specific vertex angle.

By froth load herein is meant the amount of froth in an open surface area over any given time period.

This kind of shape or construction allows for a robust way of utilising the radial froth crowder for dividing, directing and balancing froth and slurry into the two open froth areas or froth surfaces on either side of the radial froth crowder.

In an embodiment of the froth flotation cell, the surface area of a radial froth crowder is larger than the surface area of a radial froth collection launder, measured at the height of the froth surface. Preferably, the ratio of the surface area of a radial froth crowder and the surface area of a radial froth collection launder is at least 2, more preferably at least 3.

By arranging a radial froth crowder to have a surface area—that is the area formed between the sides of the radial froth crowder and the first and second froth collection channels, measured at the height of the froth surface (in relation to the bottom of the flotation tank)—larger than that of a radial froth collection launder, the reducing effect that the radial froth crowder has on the open froth surface may become more pronounced.

In an embodiment of the froth flotation cell, the tank comprises open froth surfaces between froth collection channels and radial froth collection launders, and inside the second froth collection launder.

In a further embodiment of the froth flotation cell, an open froth surface between any two radial froth collection launders is dividable into two open froth subsurfaces by a radial froth crowder, one open froth subsurface on the side of the first radial froth overflow lip of a first radial froth collection launder, and one open froth subsurface on the side of the second radial froth overflow lip of a second froth collection channel; so that the two open froth subsurfaces are completely separated by the radial froth crowder.

In an embodiment of the froth flotation cell, a radial froth crowder is arranged to have a form which allows a froth load to be balanced between an open froth subsurface on the first side of the functional V shape and an open froth subsurface on the second side of the functional V shape.

In an embodiment of the froth flotation cell, in that the area of open froth surface is arranged to be varied so that the relationship between open froth subsurfaces between two radial froth collection launders and an open froth subsurface inside the first overflow lip of the second froth collection channel is changed.

In an embodiment of the froth flotation cell, the relationship between the two open froth subsurfaces separated by a radial froth crowder is arranged to be varied by changing the vertical position of the radial froth crowder in relation to the height, measured from the bottom of the tank, of a radial froth overflow lip next to the radial froth crowder.

The relationship between the two open froth subsurfaces may be arranged to be varied in such a way that it does not affect the balance of the two open froth subsurfaces, e.g. when they are already in balance. By moving only the radial froth crowder, the construction may be kept simple. If a radial froth collection launder or the froth collection channels were to be moved, the controlling of that movement would be extremely precise and accurate, as it would affect the height of the froth layer. If a froth overflow lip would end up slanted or deviate from the horizontal, problems in collecting the froth into the launders would arise. Obviously the radial froth crowder needs to be positioned carefully, as well, but even if the radial froth crowder would deviate somewhat from the horizontal, the froth layer height would not be as adversely affected.

The relative position of the lower part of the radial froth crowder, i.e. the apex of the functional V shape, may have an effect on the froth formation, especially on the amount of air or other flotation gas directed into the froth layer, and thereby on the volume of froth. In this way, the various open froth surfaces and subsurfaces may be balanced and an overflow of valuable material containing particles increased. Further, the crowding and/or directing of the froth, especially brittle froth, may be more efficient and simple. Furthermore, by arranging the radial froth crowder to be moveable, instead of moving the froth overflow lip or lips, the overall construction may become more robust and easier to control. Moving the radial froth crowder is not as critical to the controlling of the flotation process as moving the froth overflow lip would be.

In an embodiment of the froth flotation cell, the gas supply is arranged into the tank.

By arranging a gas supply directly into the flotation tank, no additional gasification tanks or systems are needed within the flotation system, therefore making the overall construction simpler and easier to operate and maintain.

In an embodiment of the froth flotation cell, the tank comprises a mixing device.

In an embodiment of the froth flotation cell, the mixing device comprises a gas supply.

In an embodiment of the froth flotation cell, the pulp area is at least 40 $m^2$, measured at mixing area.

In an embodiment of the froth flotation cell, it has a volume of at least 150 $m^3$, or at least 250 $m^3$, or at least 400 $m^3$.

In an embodiment of the froth flotation cell, a radial froth collection launder is arranged to be supported by the second froth collection channel.

This way, a radial froth collection channel may be supported from both ends facilitating a structure for the channel, which takes a reduced spatial volume inside the cell. Additionally, this allows reducing height of the radial froth collection channel, while still maintaining the structural strength necessary for reliably operating the froth flotation cell.

In an embodiment of the froth flotation cell, the cell comprises an equal number of radial froth collection launders and radial froth crowders, for example four of both, arranged alternately on a circumference surrounding the second froth collection channel. The radial froth collection launders may be arranged to be supported by the second froth collection channel.

Because of this, the open froth surfaces on the two sides of the each radial froth collection launder and/or radial froth collection crowder are automatically balanced.

In an embodiment of the froth flotation cell, the radial froth collection launder comprises a straight radial froth overflow lip or a zigzag radial froth overflow lip.

By arranging the overflow lip to have a zigzag or wavy shape, the functional launder lip length may be increased while the physical lip length remains the same.

In an embodiment of the froth flotation cell, the radial froth collection launder comprises a straight froth overflow lip.

A straight shape of an overflow lip may be used to keep the lip clean of dirt and impurities.

In an embodiment of the froth flotation line, the scavenger part comprises at least one froth flotation cell.

In an embodiment of the froth flotation line, the rougher part comprises at least one froth flotation cell. Large flotation cells improve froth flotation, in particular for low grade Cu ore. For this purpose, it is advantageous to use a large cell in the rougher part. In particular, the crowder structure according to the invention allows increasing the size of the froth flotation cell, while improving the recovery of minerals. For this purpose, the froth flotation cell may have a volume of at least 400 $m^3$.

In an embodiment of the froth flotation line, the flotation line comprises at least two rougher or scavenger flotation cells and/or at least two additional froth flotation cells according to the invention, arranged to treat the slurry before it is arranged to be treated in the froth flotation cell according to the invention. The last flotation cell of the froth flotation line is, therefore, a froth flotation cell according to the invention.

By rougher flotation, rougher part of the flotation line, rougher stage and/or rougher cells herein is meant a flotation stage that produces a rougher concentrate. The objective is to remove a maximum amount of the valuable mineral at as coarse a particle size as practical. Complete liberation is not required for rougher flotation, only sufficient liberation to release enough gangue from the valuable mineral to get a high recovery. The primary objective of a rougher stage is to recover as much of the valuable minerals as possible, with less emphasis on the quality of the concentrate produced.

Rougher flotation is often followed by scavenger flotation that is applied to the rougher tailings. By a scavenger flotation, a scavenger part of the flotation line, scavenger stage and/or a scavenger cell is meant a flotation stage wherein the objective is to recover any of the valuable mineral material that was not recovered during the initial rougher stage. This might be achieved by changing the flotation conditions to make them more rigorous than the initial roughing, or, in some embodiments of the invention, by the introduction of microbubbles into the slurry. The concentrate from a scavenger cell or stage could be returned to the rougher feed for re-floating or directed to a regrinding step and thereafter to a scavenger cleaner flotation line.

Any type of flotation cell or flotation tank may be utilised as a rougher or a scavenger flotation cell, and the type may be chosen according to the specific needs set by the type of material to be treated in the flotation line. It is conceivable, that the froth flotation cell or cells according to the invention may be incorporated into existing flotation lines as rebuilds, to increase the variability in use, as well as the efficiency in collecting the desired valuable material, of the flotation line. Typically, in the downstream end of a flotation line, the amount of ore particles containing the valuable material is low, as most part of the floatable material has been trapped and collected already in the upstream part of the flotation line. By introducing one or more froth flotation cells according to the invention into the downstream end of such a flotation line, even the low amount still left in the slurry may be efficiently collected with the help of the froth flotation cells described herein, and thus the overall efficiency of the flotation line improved. This may be especially beneficial in operations where the froth or froth layer is brittle and/or mineralization is low.

In an embodiment of the use of a froth flotation line according to the invention, the flotation line is arranged to recover mineral ore particles comprising a desired mineral from low grade ore.

In a yet another embodiment of the use of a froth flotation line according to the invention, the flotation line is arranged to recover mineral ore particles comprising Cu from low grade ore.

For example, in recovering copper from low grade ores obtained from poor deposits of mineral ore, the copper amounts may be as low as 0.1% by weight of the feed, i.e. infeed of slurry into the flotation line. The froth flotation line according to the invention may be very practical for recovering copper, as copper is a so-called easily floatable mineral. By using the flotation line according to the present invention, the recovery of such low amounts of valuable mineral, for example copper, may be efficiently increased, and even poor deposits cost-effectively utilized. As the known rich deposits have increasingly already been used, there is a need for processing the less favourable deposits as well, which previously may have been left unmined due to lack of suitable technology and processes for recovery of the valuable material in very low amounts in the ore.

In an embodiment of the froth flotation method, the two open froth subsurfaces are completely separated by a radial froth crowder.

In an embodiment of the froth flotation method, the area of an open froth surface is varied so that the relationship between open froth subsurfaces between two radial froth collection launders and an open froth subsurface inside the first overflow lip of the second froth collection channel is changed.

In an embodiment of the froth flotation method, the relationship between the two open froth subsurfaces separated by a radial froth crowder is varied by changing the vertical position of the radial froth crowder in relation to the height of a radial froth overflow lip next to the radial froth crowder.

BRIEF DESCRIPTION OF THE DRAWINGS

The accompanying drawings, which are included to provide a further understanding of the current disclosure and which constitute a part of this specification, illustrate embodiments of the invention and together with the description help to explain the principles of the invention. In the drawings.

DETAILED DESCRIPTION OF THE INVENTION

Figure 1A:
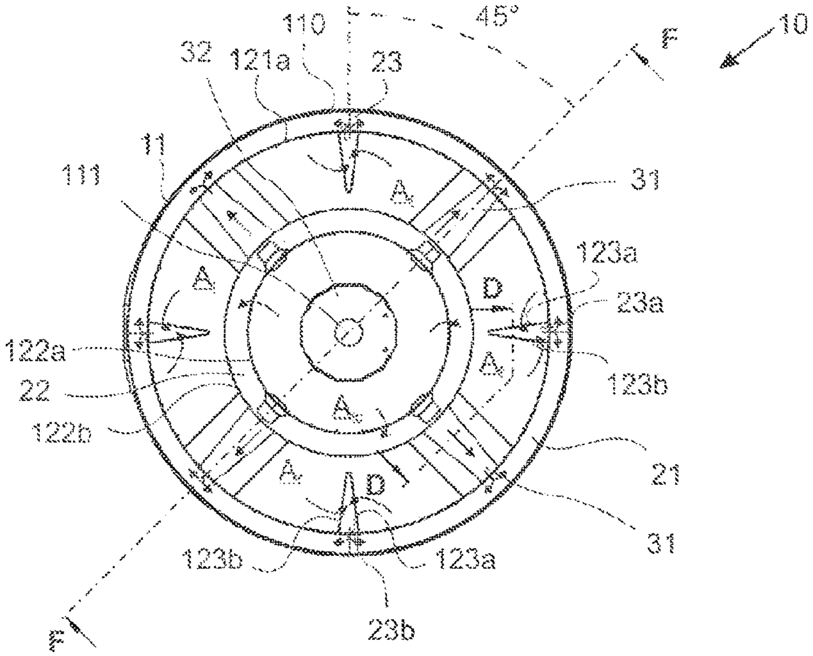
FIGS. 1*a*, 1*b* and 1*c* are a schematic transverse cross-section of a froth flotation cell according to exemplary embodiments of the invention.
Figure 1B:
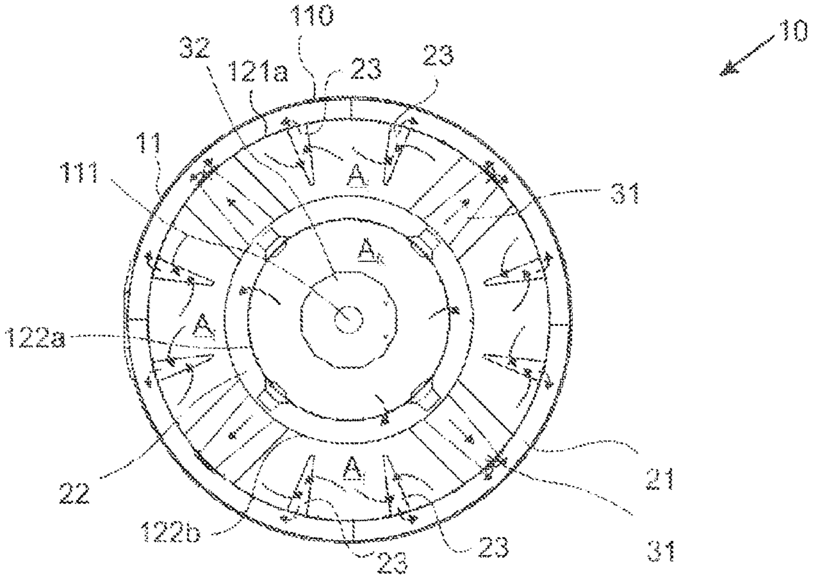
Figure 1C:
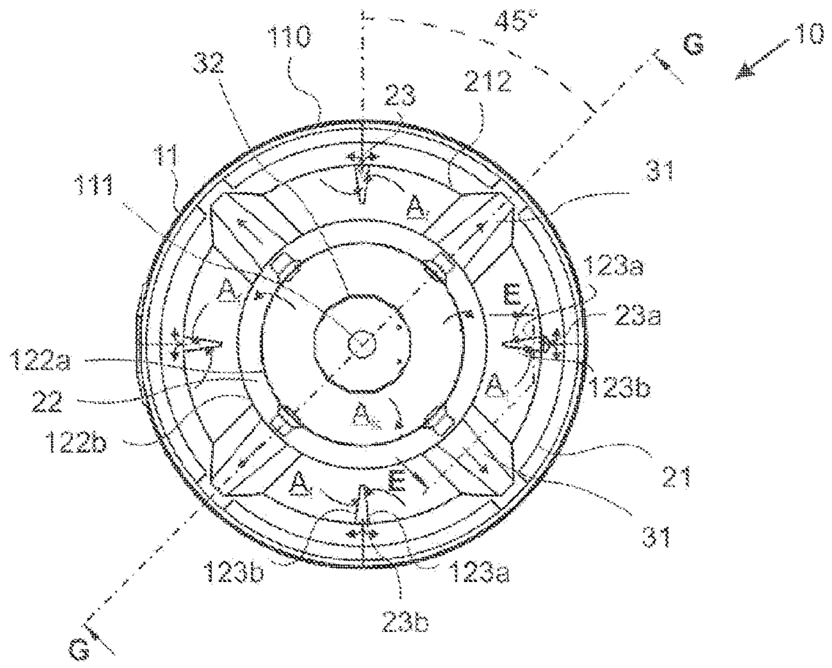

Reference will now be made in detail to the embodiments of the present invention, examples of which are illustrated in the accompanying drawings.

The description below discloses some embodiments in such a detail that a person skilled in the art is able to utilize the froth flotation cell, line, use and method based on the disclosure. Not all steps of the embodiments are discussed in detail, as many of the steps will be obvious for the person skilled in the art based on this disclosure. The figures are not drawn to proportion, and many of the components of the froth flotation cell 10 and froth flotation line 1 are omitted for clarity. The forward direction of flow of slurry 1 is shown in the figures by arrows.

For reasons of simplicity, item numbers will be maintained in the following exemplary embodiments in the case of repeating components.

In FIGS. 1*a-j* and 3*a-d* to 6*b*, a tank 11 of a froth flotation cell 10 receives a flow of suspension, that is, a flow of slurry 100 comprising ore particles, water and flotation chemicals such as collector chemicals and non-collector flotation reagents. The collector chemical molecules adhere to surface areas on ore particles having a desired mineral to be floated, through an adsorption process. The desired mineral acts as the adsorbent while the collector chemical acts as the adsorbate. The collector chemical molecules form a film on the areas of the desired mineral on the surface of the ore particle to be floated. Typically, the desired mineral is a valuable mineral contained in the ore particle. In reverse flotation, the mineral may be the invaluable part of the slurry suspension thus collected away from the concentrate of the valuable material. For example in reverse flotation of Fe, silicate-containing ore particles are floated while the valuable Fe-containing ore particles are collected from the underflow or tailings.

The collector chemical molecules have a non-polar part and a polar part. The polar parts of the collector molecules adsorb to the surface areas of ore particles having the valuable minerals. The non-polar parts are hydrophobic and are thus repelled from water. The repelling causes the hydrophobic tails of the collector molecules to adhere to flotation gas bubbles. An example of a flotation gas is atmosphere air introduced, for example by blowing, compressing or pumping, into froth flotation cell 10 or a tank 11 of the flotation cell 10. A sufficient amount of adsorbed collector molecules on sufficiently large valuable mineral surface areas on an ore particle may cause the ore particle to become attached to a flotation gas bubble. This phenomenon may be called mineralization. In low mineralization, less than optimal amount of ore particles are attached to flotation gas bubbles, leading to brittle froth and problems in recovering the desired ore particles from the froth layer to a froth overflow lip and froth collection launder.

Ore particles become attached or adhered to gas bubbles to form gas bubble-ore particle agglomerates. These agglomerates rise to the surface 113 of the flotation tank 11 at the uppermost part of the tank 11 by buoyancy of the gas bubbles, as well as with the continuous upwards flow of slurry induced by mechanical agitation and/or the infeed of slurry 100 into the tank 11. The gas bubbles form a layer of froth 3, and the froth 3 gathered to a surface of slurry in froth flotation cell 10, comprising the gas bubble-ore particle agglomerates is let to flow out of froth flotation cell 10 as an overflow 50 via the froth overflow lips 121*a*, 122*a-b*, 123*a-b* into froth collection channels 21, 22 or into a radial froth collection launder 23.

Any or all of the froth overflow lips including the first froth overflow lip 121*a* of the first froth collection channel 21, the first froth overflow lip 122*a* of the second froth collection channel 22, the second froth overflow lip 122*b* of the second froth collection channel 22, the first froth overflow lip 123*a* of a radial froth collection launder 23, the second froth overflow lip 123*a* of a radial froth collection launder 23 and/or a froth overflow lip 123*a*, 123*b* of a radial structure may be straight or winding, e.g. a zigzag or wavy lip. While zigzag lips may be used, lip length is preferably reduced by using radial froth crowders 31 or radial structures having at least one side wall arranged as a crowder instead.

The collected slurry overflow 50 may be led to further processing or collected as a final product, depending on the point of a flotation line 1 at which the overflow 50 is collected. Further processing may comprise any necessary process steps to increase the product grade, for example regrinding and/or cleaning. Tailings may be arranged to flow as an underflow 1*a* via an outlet to a subsequent flotation cell and finally out of the process as gangue or final residue.

The slurry 100 is first introduced into a froth flotation cell 10, in which the slurry 100 is treated by introducing flotation gas into the slurry by a gas supply 12 (see FIG. 5, 6*b*) which may be any conventional means of gas supply. For example, the gas may be led into the tank via a mixing device 14 (FIG. 4, 5), or into a tank without a mixing device via gas inlets (FIG. 6*b*), as is the case in a column flotation cell. The flotation gas may be introduced into the tank 11. The flotation gas may be incorporated into to slurry prior to leading the slurry 100 into the flotation tank 11*b* in a separate pre-treatment or conditioner tank 11*a*, as is the case in a dual flotation cell (FIG. 6*a*).

Figure 4:
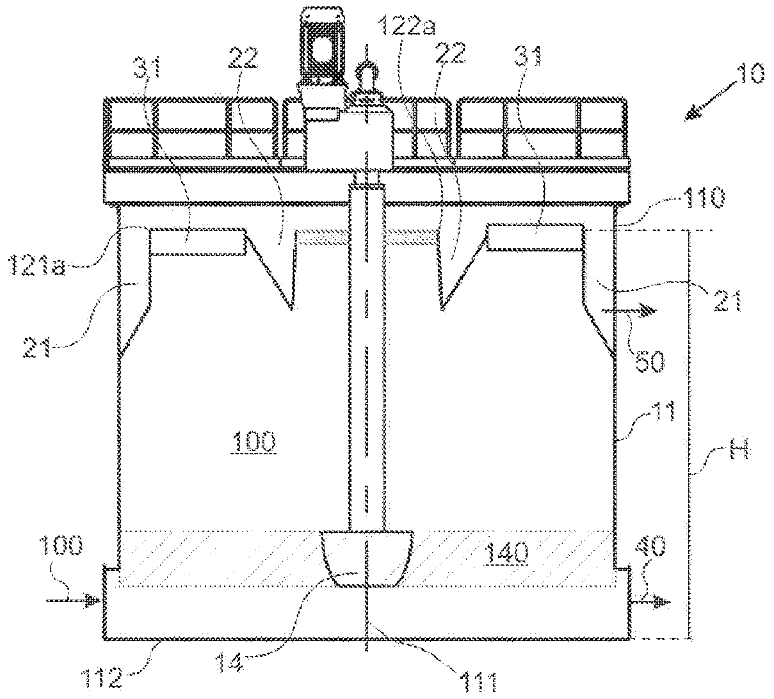
FIG. 4 is a schematic illustration of an exemplary embodiment of the froth flotation cell according to the invention.
Figure 5:
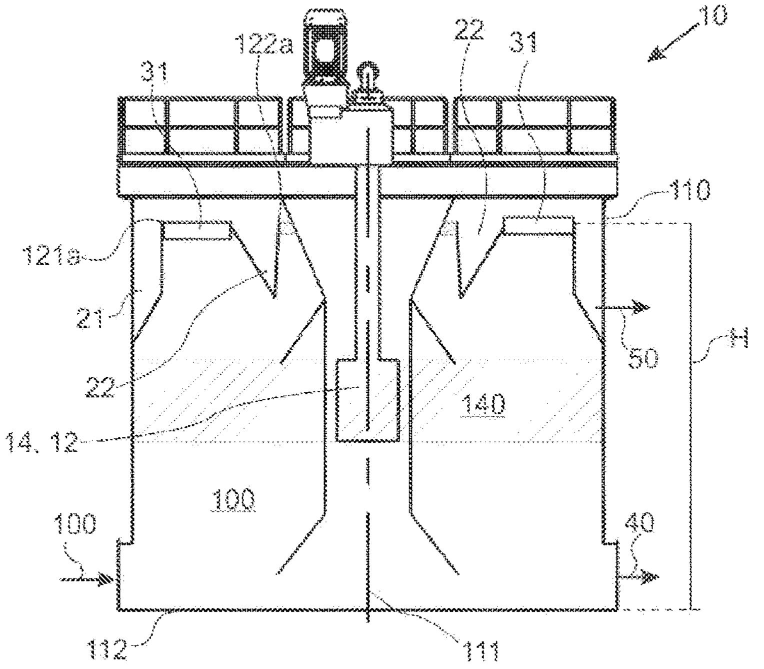
FIG. 5 is a schematic illustration of another exemplary embodiment of the cell according to the invention.
Figure 6A:
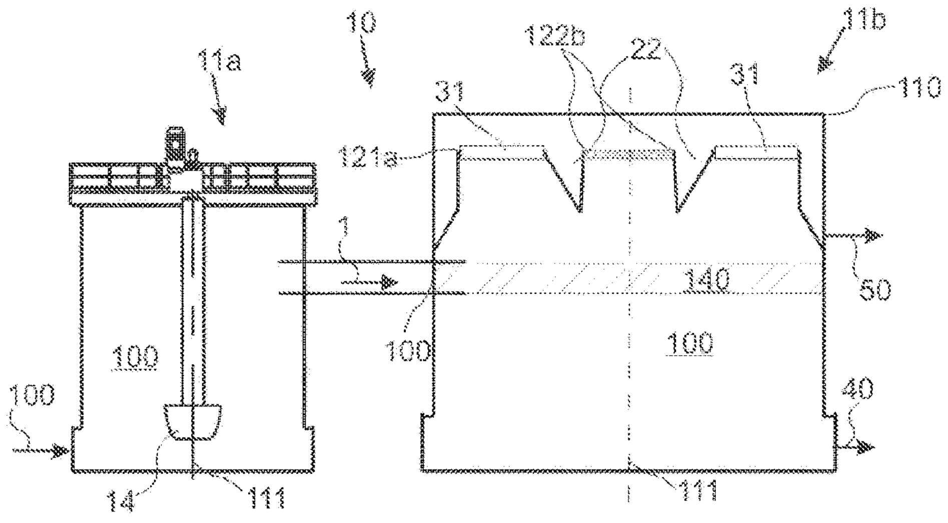
FIGS. 6*a* and 6*b* are a schematic illustration of yet another exemplary embodiment of the cell according to the invention.
Figure 6B:
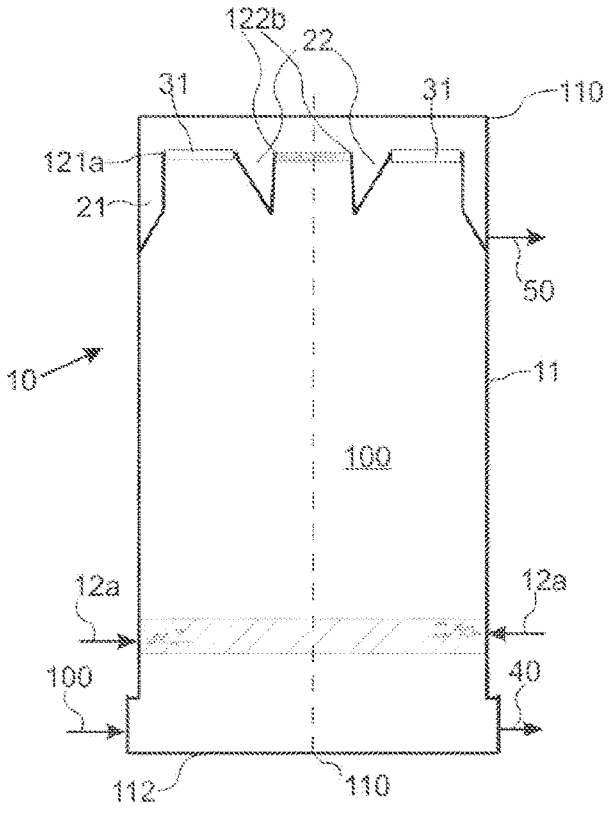

The slurry may be agitated mechanically by a mixing device 14, i.e. the tank 11 comprises a mixing device 14, which may be, for example, a rotor-stator type agitator disposed in the flotation tank 11 (FIG. 4), or by a pump 14, 12 in a so-called self-aspirating tank, as shown in FIG. 5 (the pump acts as both a mixing device 14 and a gas supply 12), or by utilising any other type of mechanical agitation known in the art. There may be one or more auxiliary agitators disposed in the flotation tank 11 in the vertical direction of the flotation tank 11, as well.

In an embodiment of the froth flotation cell 10, as seen in FIGS. 1*a-c*, 1*h*, 3*a-d* and 4, it comprises a tank 11 with a centre 111 and a perimeter 110, and a first froth collection channel 21 surrounding the perimeter 111 of the tank 11 so that an open froth surface $A_f$ is formed inside the first froth collection channel 21.

The first froth collection channel 21 may comprise a first froth overflow lip 121*a* facing towards the centre 111 of the tank 11, i.e. the first froth collection channel may act as a froth collection launder (see FIGS. 1*a-b* and FIGS. 3*a-b*). In that case, the first froth collection channel 21 may comprise a vertical sidewall 210 also facing towards the centre 111 of the tank 11. The sidewall 210 ends in the first froth overflow lip 121*a*, i.e. the first froth collection lip 121*a* is arranged at the top of the sidewall 210.

Figure 3A:
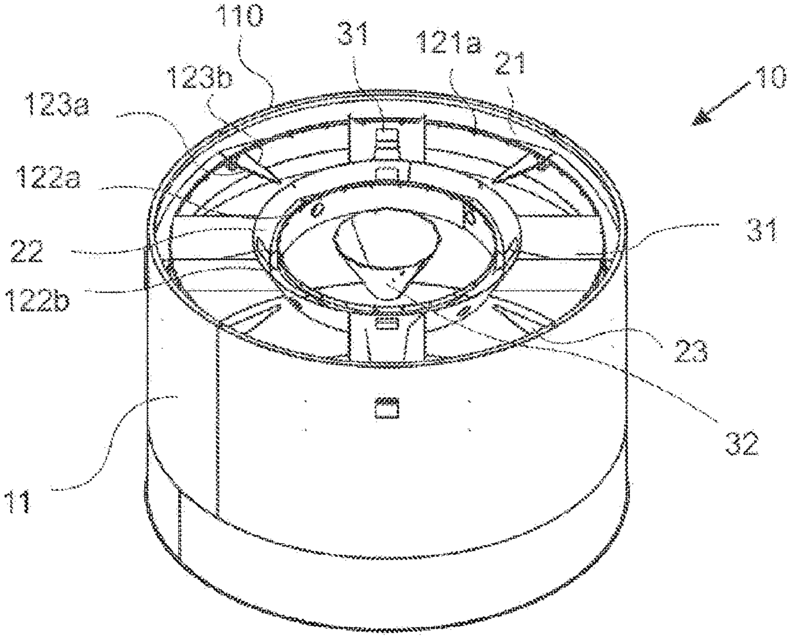
FIGS. 3*a*, 3*b*, 3*c* and 3*d* are schematic three-dimensional projections of exemplary embodiments of the froth flotation cell according to the invention.
Figure 3B:
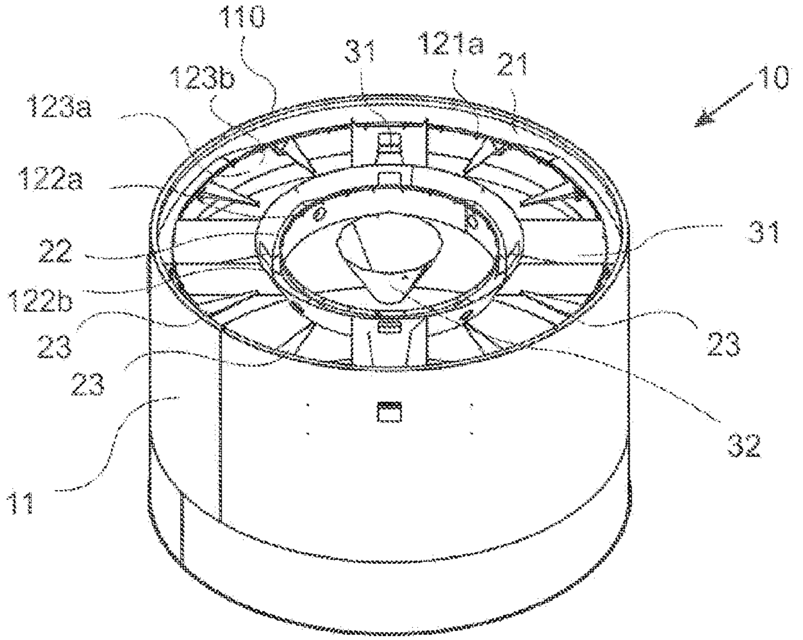
Figure 3C:
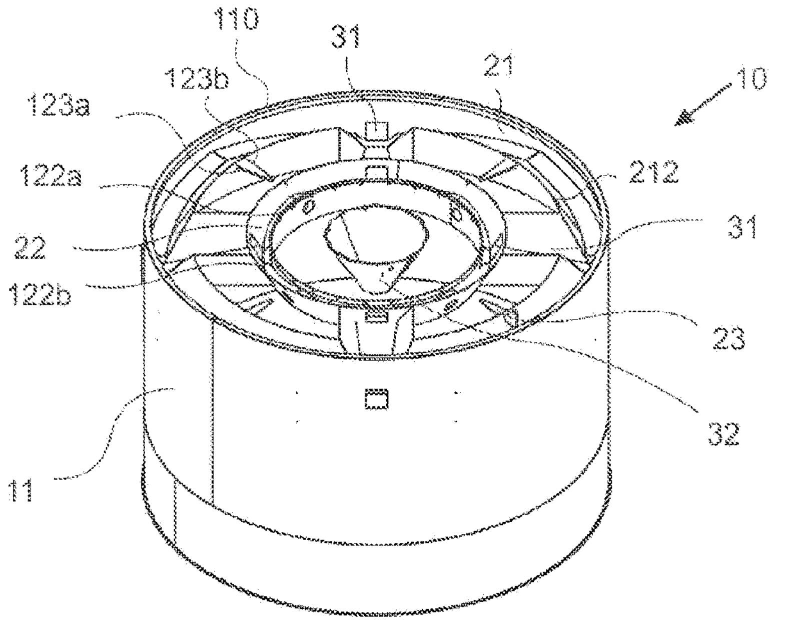
Figure 3D:
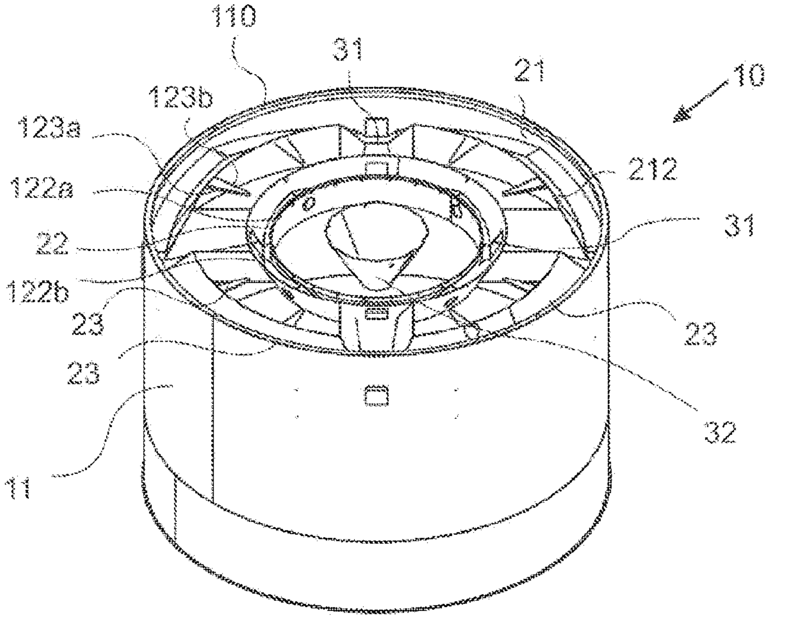

Alternatively, the first froth collection channel 21 may comprise a side structure 212 facing towards the centre 111 of the tank 11 (see FIGS. 3*c-d*). The side structure 212 is arranged to crowd froth 3 away from the first froth collection channel 21, towards the centre 111 of the tank 11. The side structure 212 is inclined so that in relation to the vertical n of the tank 11, the side structure 212 has an angle of inclination of 20-40° or even 20-80°. The angle of inclination may for example be 24°, 28.5°, 30°, 35° or 37.5°.

The froth flotation cell 10 further comprises a second froth collection channel 22 arranged between the centre 111 of the tank 11 and the first froth collection channel 21. The second froth collection channel 22 comprises a first froth overflow lip 122*a* facing towards the centre 111 of the tank 11.

The froth flotation cell 10 may also comprise a central froth crowder 32 arranged inside the second froth collection channel 22, as shown in FIGS. 1*a-c* and 3*a-d*. The central froth crowder 32 may be positioned on the centre 111 of the tank 11, for example axially along the centre axis of the tank 11. The central froth crowder 32 may be conical or frustoconical with its narrow end pointing towards the bottom 112 of the tank 11. The central froth crowder 32 may be adjusted to control an open froth surface formed inside the second froth collection channel 22. For this purpose, the vertical position of the central froth crowder may be arranged to be varied in relation to the height, measured from the bottom of the tank, of the first froth overflow lip 122*a* of the second froth collection channel 22.

The second froth collection channel 22 may further comprise a second overflow lip 122*b* facing towards the perimeter 110 of the tank 11. In that case, similarly to the first froth collection channel 21, the second froth collection channel 22 may comprise a vertical sidewall 220 also facing towards the centre 111 of the tank 11. The sidewall 220 ends in the second froth overflow lip 122*b*, i.e. the second froth collection lip 122*b* is arranged at the top of the sidewall 220.

Alternatively, the second froth collection channel 22 may further comprise a side structure 222 facing towards the perimeter 110 of the tank 11. The side structure 222 is arranged to crowd froth 3 away from the second froth collection channel 22, towards the perimeter 110 of the tank 11. The side structure 222 is inclined so that in relation to the vertical n of the tank 11, the side structure 222 has an angle of inclination of 20-40° or even 20-80°. The angle of inclination may for example be 24°, 28.5°, 30°, 35° or 37.5°.

Froth 3 collected into the second froth collection channel 22 is arranged to be directed to the first froth collection channel 21. This may be realized for example by separate connecting pipe or pipes or other conduits (not shown in the figures).

The froth flotation cell 10 also comprises a radial froth collection launder 23 extending from the first froth collection channel 21 towards the second froth collection channel 22.

A radial froth collection launder 23 comprises at least one radial froth overflow lip 123*a*. In an embodiment, it may comprise a first radial froth overflow lip 123*a* and a second radial froth overflow lip 123*b* opposite the first (see FIG. 2*a*), i.e. both sides of the radial froth collection launder act as collecting structures allowing overflow of froth and/or slurry to be collected into the radial froth collection launder 23. At least one radial froth overflow lip 123*a* is arranged to face a crowding sidewall 310 of a radial froth crowder 31, which allows the crowding effect from the froth crowder to efficiently push and direct material in the froth 3 layer towards the radial froth collection launder 23. Both the first and the second radial froth overflow lips 123*a*, 123*b* may be arranged to face a crowding sidewall 310, 320 of radial froth crowders 31, between which the radial froth collection launder is situated (see for example FIG. 3*c*).

Figure 2A:
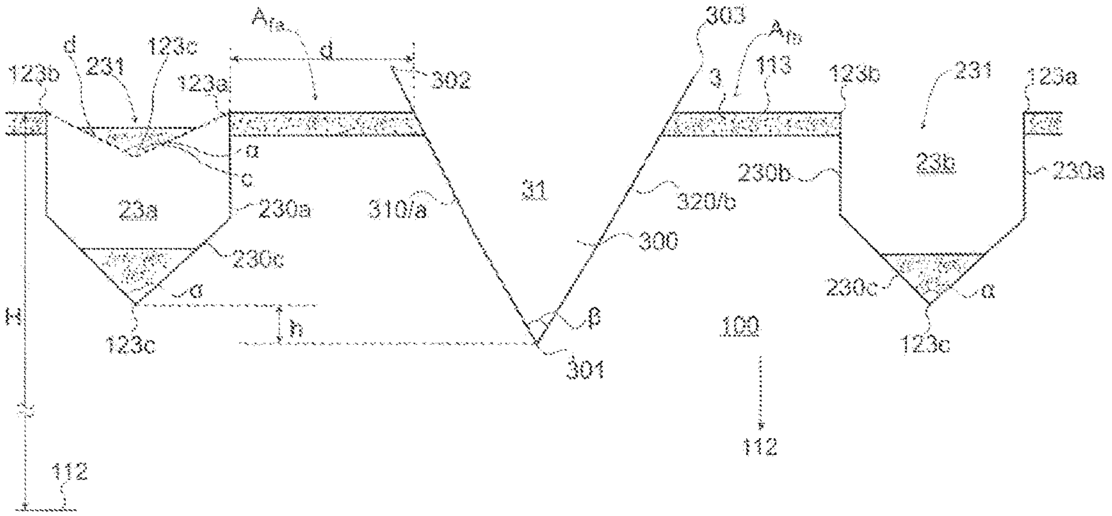
FIGS. 2*a*, 2*b* and 2*c* are schematic radial cross-sections showing details of embodiments of a froth flotation cell according to the invention.
Figure 2B:
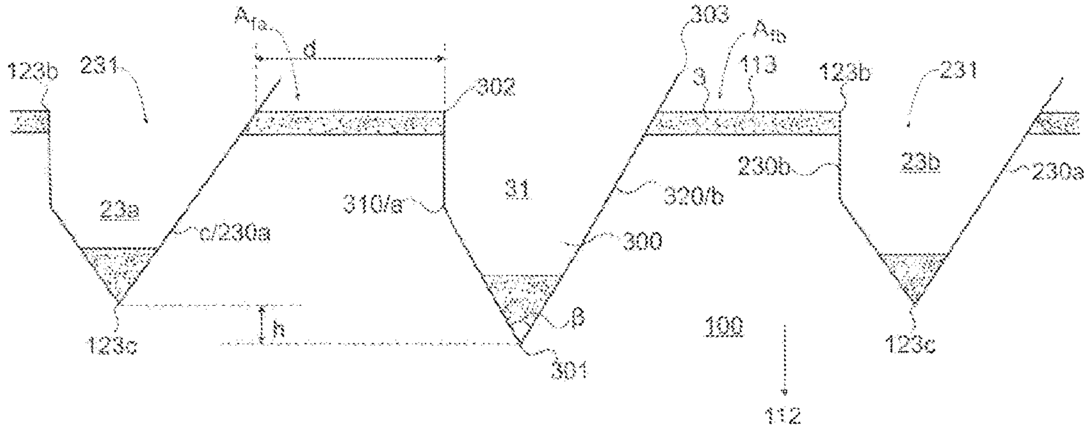

A radial froth collection launder 23 may also comprise a sidewall 230*a* which is a crowding sidewall, i.e. one side of the radial launder 23 is not collecting froth but provides a crowding effect (see FIG. 2*b*). This crowding sidewall is arranged to face a froth collection lip 302 of an adjacent radial froth crowder 31, to push and direct the flow of froth and/or slurry towards this collecting structure.

A radial froth collection launder 23 is in fluid communication with the first froth collection channel 21. There may be at least one radial froth collection launder 23 in the froth flotation cell 10. In an embodiment, the froth flotation cell 10 may comprise four such radial froth collection launders 23, as illustrated for example in FIGS. 1*a*, 1*c*, 3*a* and 3*c*. In another embodiment, the froth flotation cell 10 may comprise eight such radial froth collection launders 23, as illustrated for example in FIGS. 1*b*, 1*h*, 3*b* and 3*d*. The number of radial froth collection launders 23 may be readily chosen according to the size (tank diameter, tank volume, pulp area $A_p$) of the froth flotation cell, and/or according to any other relevant flotation process parameter. The froth collection launders 23 may be arranged symmetrically with respect to each other and/or the centre 111 of the tank 11. For example, they may be arranged with a separation of substantially 30, 60 or 90 degrees with respect to a central longitudinal axis of the tank 11.

A radial froth collection launder 23 may be arranged to collect froth 3 from the surface 113 of the tank 11, and to direct the collected froth 3 to the first froth collection channel 21. A radial froth collection launder 23 is arranged in fluid communication with the first froth collection channel 21. Any or all radial froth collection launders 23 may be arranged separate from the from the second froth collection channel 22 (see FIGS. 1*a-c* and 3*a-d*) so that they are not in fluid communication, at least a direct fluid communication, with the second froth collection channel 22. Any or all radial froth collection launders 23 may therefore be shorter than the radial distance between the first froth collection channel 21 and the second froth collection channel 22.

Figure 1D:
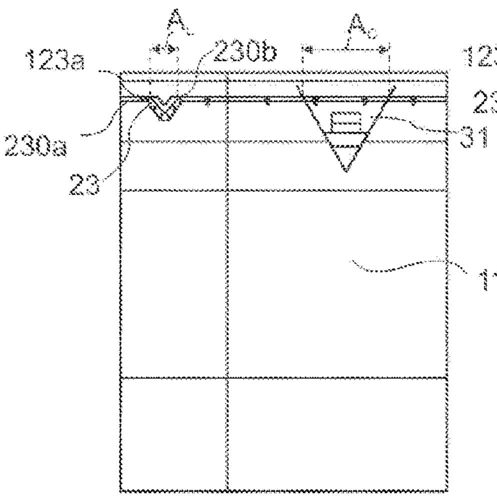
FIG. 1*d* is a further cross-section along the line D-D of FIG. 1*a* of a froth flotation cell according to the exemplary embodiment invention.
Figure 1E:
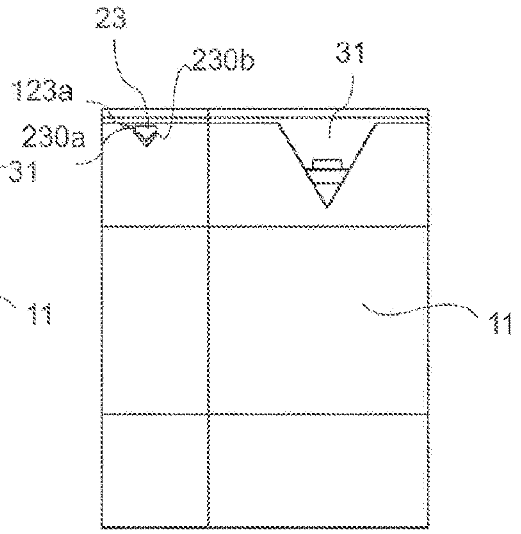
FIG. 1*e* is a further cross-section along the line E-E of FIG. 1*c* of a froth flotation cell according to the exemplary embodiment invention.
Figure 1F:
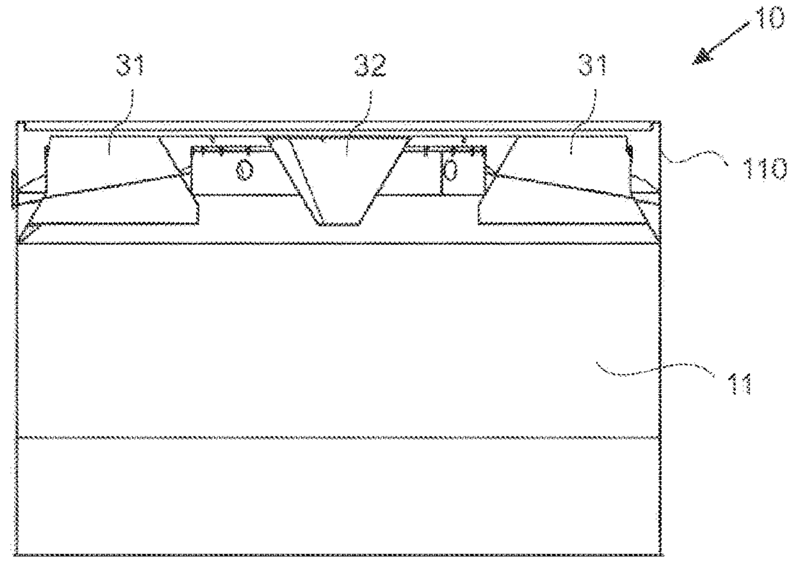
FIG. 1*f* is a further cross-section along the line F-F of FIG. 1*a* of a froth flotation cell according to the exemplary embodiment invention.
Figure 1G:
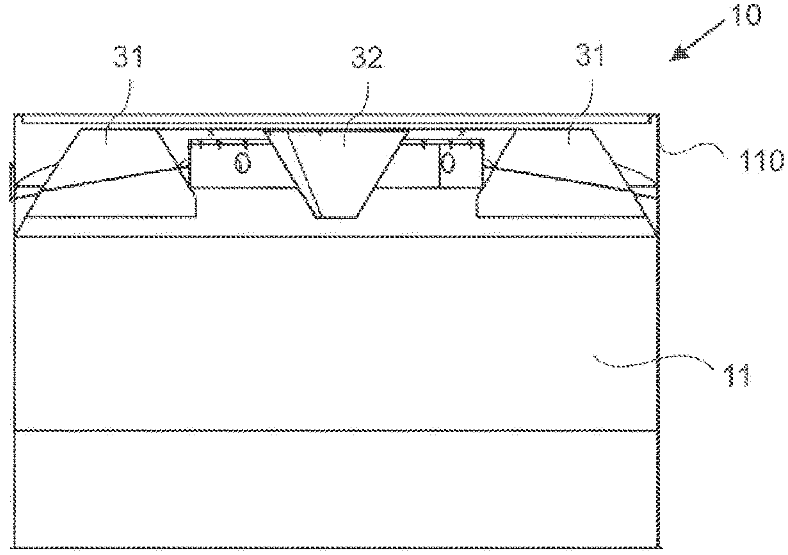
FIG. 1*g* is a further cross-section along the line G-G of FIG. 1*c* of a froth flotation cell according to the exemplary embodiment invention.
Figure 1H:
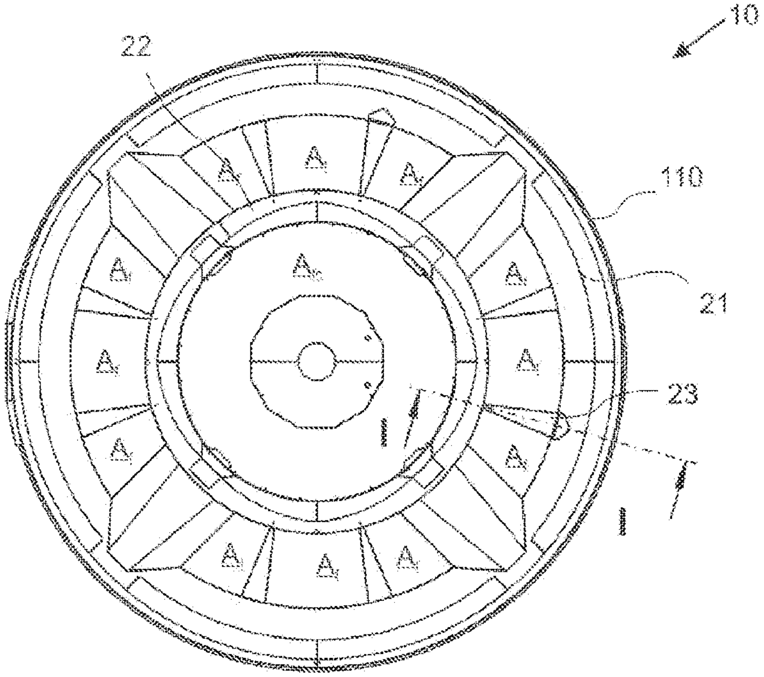
FIG. 1*h* is a cross-section of another exemplary embodiment of the froth flotation cell according to the invention.
Figure 1I:
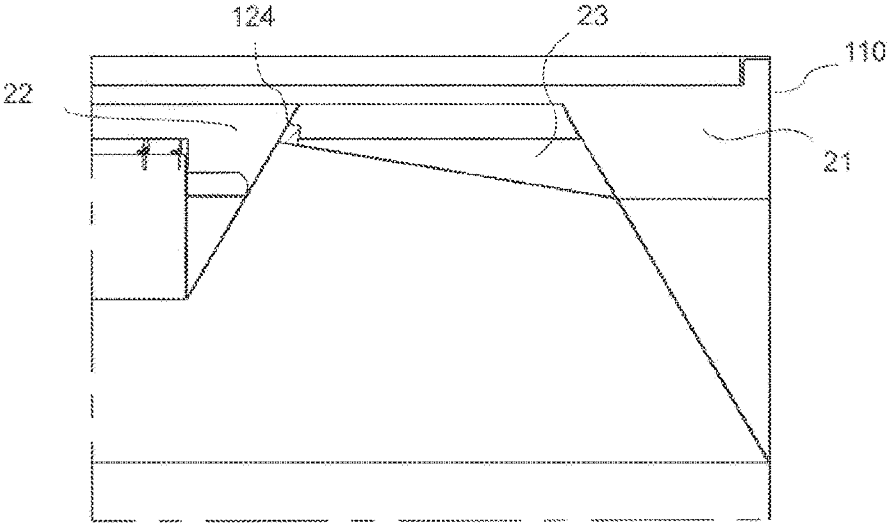
FIG. 1*i* is a further cross-section along the line I-I of FIG. 1*h* of a froth flotation cell according to the exemplary embodiment invention.
Figure 1J:
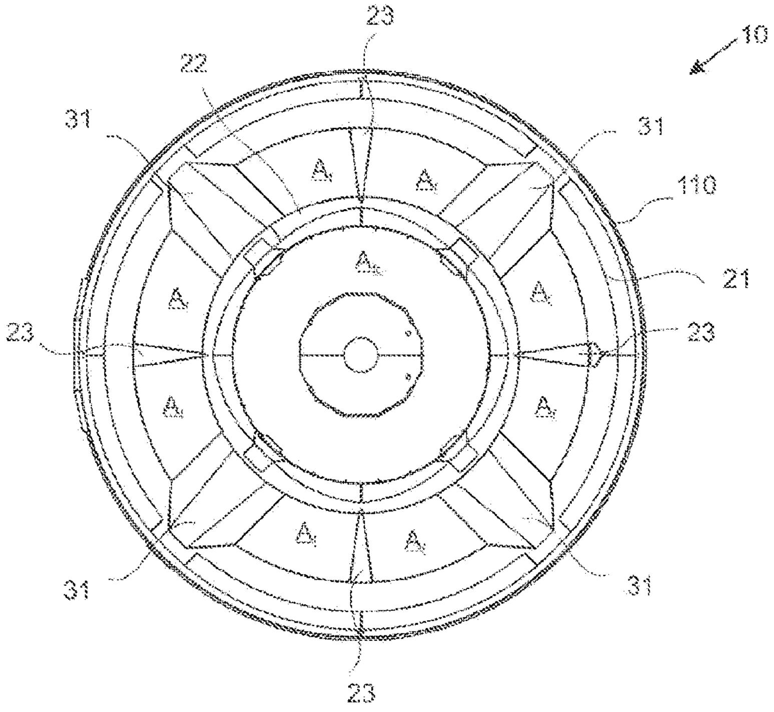
FIG. 1*j* is a cross-section of another exemplary embodiment of the froth flotation cell according to the invention.

Alternatively or additionally, any or all radial froth collection launders 23 may be arranged to be supported by the second froth collection channel 22 (see FIGS. 1*h-j*). This may be arranged as a structural connection, e.g. a direct structural connection 124, between a radial froth collection launder 23 and the second froth collection channel 22. The radial froth collection launders 23 may therefore be at least as long as the radial distance between the first froth collection channel 21 and the second froth collection channel 22. Depending on the length of the radial froth collection launders 23, any or all of them may be arranged to divide the open froth surfaces $A_f$ into separated subsurfaces but they may also be arranged so that they do not divide the open froth surfaces $A_f$ into separated subsurfaces, i.e. they facilitate direct connection of the subsurfaces.

A radial froth collection launder 23 may arranged to have a shape that prevents flotation gas bubbles from colliding under the radial froth collection launder 23, and a shape that also prevents froth 3 from moving away from the radial froth collection launder 23. Further, the radial froth collection launder 23 may be arranged to have a shape that directs froth 3 to flow into the radial froth collection launder.

This shape is realized by the radial froth collection launder 23 having at least one radial froth overflow lip 123*a*, 123*b* for gathering froth.

For example, the froth collection launder 23 may have a shape in which the cross-section of a radial froth collection launder 23 in the radial direction of the tank 11 is substantially V shaped form (see FIG. 2*a*) comprising an apex 123*c* pointing towards the bottom 112 of the tank 11, a first inclined sidewall c and a second inclined sidewall d extending from the apex 123*c* so that an apex angle α is formed between the first and the second inclined sidewalls c, d, and a first radial froth overflow lip 123*a* at the top of the first inclined sidewall c and a second radial froth overflow lip 123*b* at the top of the second inclined sidewall d.

A radial froth collection launder 23 may also have a cross-section in the radial direction of the tank 11 of a functional V shape (see FIG. 2*a*, where this alternative form may be seen within the radial froth collection launder 23*a*. The functional V shape comprises an apex pointing towards the bottom 112 of the tank 11, and an inclined first sidewall and an inclined second sidewall extending from the apex so that an apex angle α is formed between the first and the second sides. The apex angle α may be even 20-160°. The at least one froth overflow lip 123*a*, 123*b* for gathering froth is formed above the functional V shape. The structure may comprise one or more additional side walls extending from the functional V shape e.g. vertically or in an inclined fashion. A low profile of the radial collection launder 23, for example one with apex angle α being 120-160° is advantageous in reducing the spatial volume the launder 23 takes in the tank 11. The at least one froth overflow lip 123*a*, 123*b* may then be formed directly at the edge and/or edges of the functional V shape or on top of a side wall extending only a short distance therefrom. In particular, the invention allows reducing the length of the overflow lip 123*a*, 123*b* while improving recovery of froth 3.

A sidewall 230*b, c* arranged as a crowding sidewall may be inclined, as shown in FIG. 2*b*, to increase the crowding effect.

Alternatively, the froth collection launder 23 may comprise a vertically extending first sidewall 230*a* and a vertically extending second sidewall 230*b* opposite the first sidewall 230*a*. The first and the second sidewalls 230*a*, 230*b* may have a length of at least 5 mm, to ensure that the radial froth collection launder 23 extends sufficiently deep into the layer of froth 3 on the surface of the tank 11, and that the vertical sidewall may efficiently direct froth 3 to flow over radial froth overflow lips 123*a*, 123*b* of the radial froth collection launder 23.

A first radial froth overflow lip 123*a* may be arranged at the top of the first sidewall 230*a*, and a second radial froth overflow lip 123*b* is arranged at the top of the second sidewall 230*b*, i.e. the first and second sidewalls 230*a*, 230*b* both end, at their upper parts (the parts extending closer towards the surface 113 of the tank 11), into the radial froth overflow lips 123*a*, 123*b*. The first and second sidewalls 230*a*, 230*b* are connected from their lower parts (the parts extending closer towards the bottom 112 of the tank 11) by a substantially V shaped inclined bottom 230*c* with an apex 123*c* pointing towards the bottom 112 of the tank 11. The first and second sidewalls 230*a*, 230*b* and the bottom 230*c* together define a channel 231 for directing froth 3 to the first froth collection channel 21. The bottom 230*c* may comprise an inclined first sidewall and an inclined second sidewall extending from the apex 123*c* so that an apex angle α is formed between the first and the second sides. The angle α may be a freely chosen value between 20-80°.

A radial froth collection launder 23 may have a substantially rectangular cross-section in the horizontal direction of the tank 11, i.e. the first and second sidewalls are straight. In an embodiment, for example as illustrated in FIGS. 1*a-c* and 3*a-d*, the first and second sidewalls may be so inclined that the radial froth collection launder 23 is broader or wider closer to the first froth collection channel 21 and narrower closer to the second froth collection channel 22, i.e. the channel 231 may expand towards the flow of froth 3 into the first froth collection channel 21.

Alternatively or additionally, the apex 123*c* may have a substantially level height in relation to the bottom 112 of the tank 11 through the length of the radial froth collection launder 23. In an embodiment, the height of the apex 123*c* may decrease along its extension from the second froth collection channel 22 towards the first froth collection channel 21, so that the channel 231 deepens in the direction of flow of froth 3 towards the first froth collection channel 21.

By arranging the shape of radial froth collection launder 23 in the above manner, it may be possible to maintain a substantially constant transport distance d between a radial froth crowder and a radial froth overflow lip 123*a*, 123*b* of a radial froth collection launder 23. Further, the shape of the radial froth collection launder 23 as seen from the above (see FIGS. 1*a-c* and 1*h*) may improve the collection of froth from corner areas where a radial froth collection launder 23 meets the first froth collection channel 21 or the second froth collection launder 22.

A radial froth collection launder 23 has a surface area $A_L$ measured at the froth 3 surface height H (from the bottom 112), i.e. the area formed between the first and the second sidewalls 230*a*, 230*b, c, d* and at least the first froth collection channel 21 from which the radial froth collection launder 23 extends (see FIG. 1*d*). This surface area corresponds to the reduction in area of the open froth surface $A_f$ the radial froth collection launder effect in the froth flotation cell 10.

The froth flotation cell 10 further comprises a radial froth crowder 31 extending from the second froth collection channel 22 to the first froth collection channel 22.

Figure 2C:
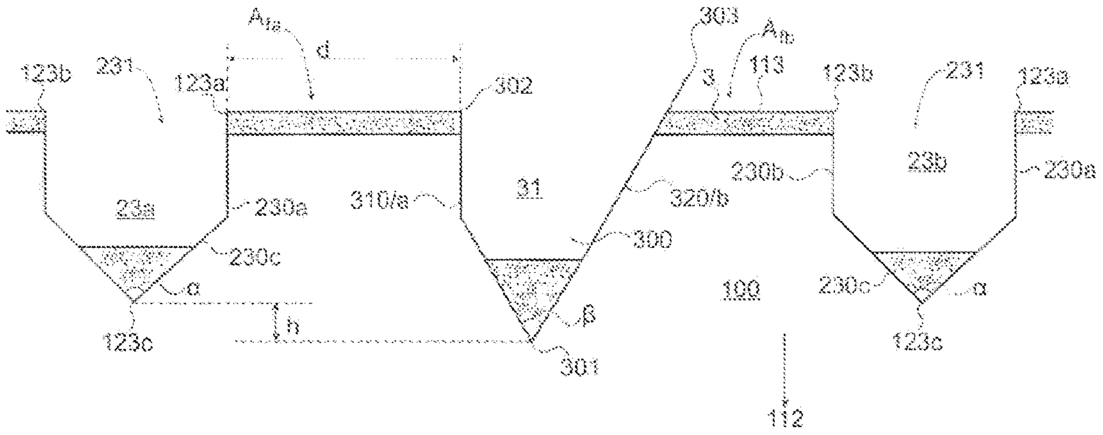

A radial froth crowder 31 comprises a crowding sidewall 310 (see FIGS. 2*a-c*). In an embodiment, a radial froth crowder 31 comprises a crowding sidewall 310, 320 and a froth collection lip 302 (i.e. the top edge 302 of the sidewall 310, a, may act as a froth collection lip 302) opposite the crowding sidewall, and that the froth collection lip 302 is arranged to face a crowding sidewall 230*a* of a radial froth collection launder 23. The radial froth crowder 31 of such a structure may therefore act as a collecting structure as froth and/or slurry from the open froth surfaces $A_f$ may overflow the froth collection lip 302. In an embodiment, the froth collection lip 302 of a radial froth crowder 31 may be arranged to face a radial froth overflow lip 123*a* of a radial froth collection launder 23 (see FIG. 2*c*). This kind of construction allows for efficient recovery of valuable mineral ore particles in the froth flotation cell 10. In case the radial froth crowder 31 is arranged to act as a collecting structure, a sidewall a is arranged to have a vertical portion (see FIGS. 2*b*, 2*c*) that efficiently directs flow of slurry and/or froth over the top edge 302 of the sidewall a, acting as a froth overflow lip 302. In other words, at the side of the froth overflow lip 302, the radial froth crowder may be arranged to have a shape similar to a radial froth collection launder, as described above.

In an embodiment, a radial froth crowder 31 may comprise a first crowding sidewall 310 and a second crowding sidewall 320, i.e. the radial froth crowder 31 is arranged to act as a conventional froth crowder.

A radial froth crowder 31 may be arranged in fluid communication with the first froth collection channel 21 and the second froth collection channel 22. Further, the radial froth crowder 31 may be arranged to direct froth from the second froth collection channel 21 to the first froth collection channel, so that the transportation of collected froth overflow may be substantially increased in volume and efficiency. A radial froth crowder 31 may be arranged to divide the open froth surfaces $A_f$ into separated subsurfaces but it may also be arranged so that it does not divide the open froth surfaces $A_f$ into separated subsurfaces, i.e. facilitating direct connection between the subsurfaces. Using the radial froth crowder 31 in combination with the second froth collection channel 22 allows notable simplification and lightening of the structure of the froth flotation cell 10. The second froth collection channel 22 allows notable improvements in terms of volume and weight for covering the area between the perimeter 110 and the centre 111.

There may be at least one radial froth crowder 31 in the froth flotation cell 10. In an embodiment, the froth flotation cell 10 may comprise four such radial froth crowders 31. The number of radial froth crowders 31 may, similarly to the number of radial froth collection launders 23, be readily chosen according to the size (tank diameter, tank volume, pulp area Ap) of the froth flotation cell, and/or according to any other relevant flotation process parameter. In an embodiment, the froth flotation cell 10 comprises an equal number of radial froth collection launders 23 and radial froth crowders 31, arranged in an interleaving manner (see FIGS. 1*a* and 1*c*). The angular separation between neighbouring radial froth collection launders 23 and/or radial froth crowders 31 may be constant.

The froth flotation cell 10 may comprise an equal number of radial froth collection launders 23 and radial froth crowders 31 arranged alternately, i.e. so that each radial froth collection launder is followed by a radial froth crowder and vice versa, when moved circumferentially in the region between the first froth collection channel 21 and the second froth collection channel 22. Any or all of the radial froth collection launders 23 may be arranged to be supported by the second froth collection channel 22 as described above (see FIG. 1*j*).

A radial froth crowder 31 may be arranged to have a shape that directs froth 3 towards radial froth overflow lips 123*a*, 123*b* of radial froth collection launders 23*a*, 23*b* next to radial froth crowder 31. The shape is arranged to prevent froth 3 from being gathered by the crowder 31.

This shape may be realized by the radial froth crowder 31 having sidewalls arranged to prevent froth 3 from going over them. For example, the radial froth crowder 31 may have a cross-section in the radial direction of the tank 11 of a functional V shape 300. The functional V shape 300 comprises an apex 301 pointing towards the bottom 112 of the tank 11, and an inclined first sidewall a, 310 and an inclined second sidewall b, 320 extending from the apex 301 so that an angle β is formed between the first and the second sides a, b. The angle β is 20-80°. The angle β may for example be 24°, 28.5°, 31°, 35° or 37.5°. Preferably the angle β is about 30°. The structure may comprise one or more additional side walls extending from the functional V shape e.g. vertically or in an inclined fashion.

The first side 1 faces the first radial froth overflow lip 123*a* of an adjacent first radial froth collection launder 23*a*, and the second side b faces the second radial froth overflow lip 123*b* of an adjacent second radial froth collection launder 23*b*. The radial froth crowder 31 is arranged between two radial froth collection launders 23 (see FIG. 2*a-c*).

In an embodiment, a radial froth collection launder 23 comprises a first froth overflow lip 123*a* and a second froth overflow lip 123*b*, and a radial froth crowder 31 comprises a first crowding sidewall 310 and a second crowding sidewall 320. In a further embodiment, the froth flotation cell is arranged to have an equal number of such radial froth collection launders 23 and radial froth crowders 31, arranged alternating and symmetrically (at equal distances from each other) on the perimeter 110 of the tank 11. These kinds of constructions allow a structure of the radial froth collection launders 23 that is light, and that takes only a small amount of space, i.e. does not reduce the volume of the tank 11 or the area of the open froth surfaces significantly.

Further, the radial froth collection launders 23 and/or radial froth crowders 31 within the froth flotation cell 10 may be arranged so that the open froth surfaces $A_f$ formed between each radial froth collection launder and/or radial froth crowder are identical in surface area.

Similarly to a radial froth collection launder 23, a radial froth crowder 31 may have a substantially rectangular cross-section in the horizontal direction of the tank 11, i.e. the first and second sides a, b are straight. In an embodiment the first and second sides a, b may be so inclined that the radial froth crowder 31 is broader or wider closer to the first froth collection channel 21 and narrower closer to the second froth collection channel 22, i.e. a channel formed by the functional V shape may expand towards the flow of froth 3 into the first froth collection channel 21. The apex 301 may have a substantially level height in relation to the bottom 112 of the tank 11 through the length of the radial froth crowder 31. In an embodiment, the height of the apex 301 may decrease along its extension from the second froth collection channel 22 towards the first froth collection channel 21, so that the channel formed by the functional V shape deepens in the direction of flow of froth 3 towards the first froth collection channel 21, i.e. the bottom of the radial froth crowder 31 may be inclined or raked towards the first froth collection channel 21 so that the radial cross-section of the froth crowder 31 is widening towards the tank perimeter 110. In this way, the transport distance d between a radial froth crowder 31 and the adjacent radial froth overflow lip 123*a* may be kept constant throughout the entire radial length which the radial froth crowder 31 and the radial froth collection launder 23 extend from the second froth collection channel 22 to the first froth collection channel 21.

A radial froth crowder has a surface area $A_C$ measured at the froth 3 surface height H (from the bottom 112), i.e. the area formed between the first and the second sidewalls 310, 320, a, b and the first and second froth collection channels 21, 22 from which the radial froth collection launder 23 extends (see FIG. 1*d*). This surface area corresponds to the reduction in area of the open froth surface $A_f$ the radial froth crowder 31 effects in the froth flotation cell 10. Preferably, the surface area $A_C$ of a radial froth crowder 31 is larger than the surface area $A_L$ of a radial froth collection launder 23. In an embodiment, the ratio $A_C/A_L$ is at least 2. In an embodiment, the ratio $A_C/A_L$ is at least 3.

This kind of arrangements are particularly suitable when a radial froth collection launder 23 comprises a first froth overflow lip 123*a* and a second froth overflow lip 123*b*, and a radial froth crowder 31 comprises a first crowding sidewall 310 and a second crowding sidewall 320. Alternatively or additionally, the above arrangements may be made even more advantageous when the froth flotation cell is arranged to have an equal number of such radial froth collection launders 23 and radial froth crowders 31, arranged alternating and symmetrically (at equal distances from each other) on the perimeter 110 of the tank 11.

The tank 11 may comprise open froth surfaces $A_f$ between froth collection channels 21, 22 and radial froth collection launders 23, as well as inside the second froth collection channel 22. An open froth surface $A_f$ between any two radial froth collection launders 23*a*, 23*b* may be divided into two open froth subsurfaces $A_{fa}$, $A_{fb}$ by a radial froth crowder 31 so that one open froth subsurface $A_{fa}$ is formed on the side of the first radial froth overflow lip 123*a* of a first radial froth collection launder 23*a*, and one open froth subsurface $A_{fb}$ on the side of the second radial froth overflow lip 123*b* of a second radial froth collection channel 23*b*. The two open froth subsurfaces $A_{fa}$, $A_{fb}$ are completely separated by the radial froth crowder 31 (see FIG. 2).

The open froth surfaces $A_f$ between froth collection channels 21, 22 may be automatically balanced with each other since they are located on a circumference with constant radial distance from the central axis of the tank 11. However, the froth surfaces $A_f$ between froth collection channels 21, 22 may be imbalanced with respect to any or all froth surfaces $A_{fc}$ inside the second froth collection channel 22. The open froth surfaces $A_f$ between froth collection channels 21, 22 may be balanced or arranged to be balanced with respect to the open froth surfaces $A_{fc}$ inside the second froth collection channel 22 by moving any or all radial froth crowders 31 vertically upwards or downwards. Specifically, all radial froth crowders 31 may be arranged to be vertically at the same height. Alternatively or additionally, the froth surfaces $A_f$ between froth collection channels 21, 22 may be balanced or arranged to be balanced with respect to the open froth surfaces $A_{fc}$ inside the second froth collection channel 22 by moving the central froth crowder 32 vertically upwards or downwards.

In an embodiment, a radial froth crowder 31 may arranged to have a form which allows a froth load to be balanced between an open froth subsurface $A_{fa}$ on the first side a of the functional V shape 300 and an open froth subsurface $A_{fb}$ on the second side b of the functional V shape 300.

In an embodiment, the area of open froth surface $A_f$ is arranged to be varied so that the relationship between open froth subsurfaces $A_{fa}$, $A_{fb}$ between two radial froth collection launders 23*a*, 23*b* and an open froth subsurface $A_{fc}$ inside the first overflow lip 122*a* of the second froth collection channel 22 is changed.

In an embodiment, the relationship between the two open froth subsurfaces $A_{fa}$, $A_{fb}$ separated by a radial froth crowder 31 is arranged to be varied by changing the vertical position of the radial froth crowder 31 in relation to the height H, measured from the bottom 112 of the tank 11, of a radial froth overflow lip 123*a*, 123*a* next to the radial froth crowder 31.

An angle formed between a radial froth crowder 31 and a radial froth collection launder 23 may not be too steep to avoid collisions between gas bubbles, which could lead to the bubbles merging. Therefore the area of open froth surfaces or subsurfaces need to be influenced not by moving a radial froth crowder 31 closer or further away from a radial froth collection launder 23, but by changing the vertical position of the radial froth crowder 31. By moving the radial froth crowder 31 lower in the vertical direction of the tank 11, the open froth subsurface may be decreased and froth crowded towards a radial froth overflow lip 123*a*, 123*b*. By moving the radial froth crowder 31 higher, the crowding effect is decreased, but at the same time, it may also be ensured that froth 3 does not flow inside the radial froth crowder 31. By moving the radial froth crowder 31, the difference of height between the apex 301 of the radial froth crowder 31 and the apex 123*c* of the radial froth collection launder 23 may essentially be varied (see FIG. 2).

The radial froth crowder 31 may be arranged to be moved by any suitable actuator or regulating unit known in the art, powered for example by an electric motor, or by hydraulic or pneumatic transfer equipment.

The froth flotation cell 10 may have a pulp area $A_p$ of at least 15 $m^2$, measured at a mixing area 140 (see FIG. 4, 5, 6*a-b*). In an embodiment, the froth flotation cell 10 may have a pulp area $A_p$ of at least 40 $m^2$. A pulp area $A_p$ may be understood as the effective froth surface area, i.e. the largest possible area on which froth may be formed, of the tank 11, measured as an area of pulp at the height of a mixing area 140, and which is in principle available for the formation of a layer of froth 3.

The mixing area 140 depends on the type of flotation cell. In a flotation cell 10 comprising a rotor 14, the mixing area 140 is defined as the mean cross-sectional area of the tank at the rotor height (FIG. 4). In a self-aspirating flotation cell 10 (FIG. 5), the mixing area 140 is defined as the mean cross-sectional area of the tank 10 at the pump 14, 12 height. In a flotation cell 10 where the gas supply 12 into the slurry is arranged into a pre-treatment tank 11*a* prior to leading the slurry into the flotation tank 11*b*, i.e. in a dual flotation tank (FIG. 6*a*), the mixing area 140 is the cross-sectional area at the height of a slurry inlet 100. In a flotation tank 10 where gas 2 is supplied via gas supply spargers 12*a* (not shown in detail), i.e. a column flotation cell (FIG. 6*b*), the mixing area 140 is defined as the cross-sectional area of the tank 10 at the gas supply sparger 12*a* height.

The froth flotation cell 10 may have a volume of at least 150 $m^3$. In an embodiment, the froth flotation cell 10 may have a volume of at least 250 $m^3$. In an embodiment, the froth flotation cell 10 may have a volume of at least 400 $m^3$. The volume of the froth flotation cell 10 may be understood to mean the volume of the tank 11, 11*b*.

Figure 7A:
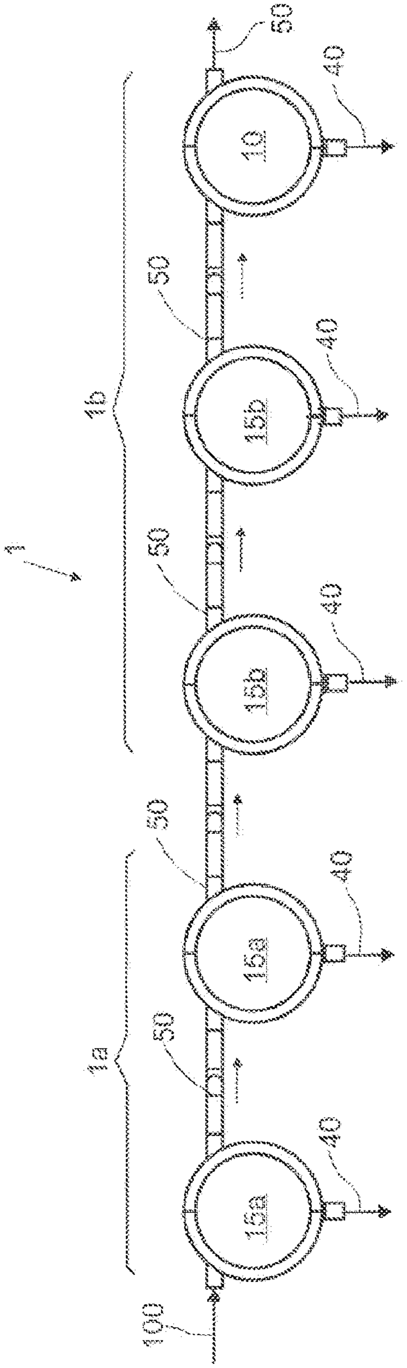
FIGS. 7*a* and 7*b* are flow chart illustrations of embodiments of a flotation line according to the invention.
Figure 7B:
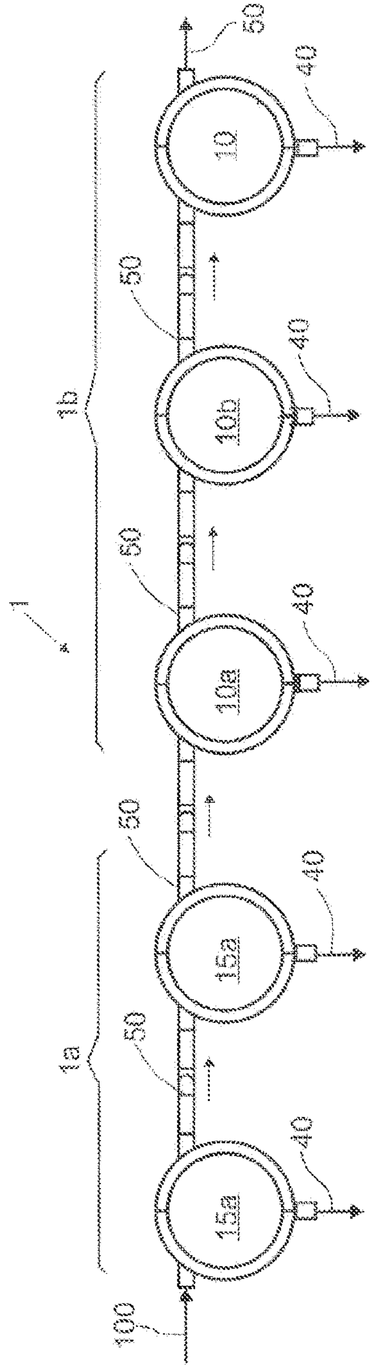

The froth flotation cell 10 described above may be a part of a froth flotation line 1 (see FIG. 7*a*-*b*). A flotation line 1 is an arrangement for treating the slurry 100 for separating valuable metal containing ore particles from ore particles suspended in the slurry in several fluidly connected froth flotation cells 10, and flotation cells 15*a*, 15*b* which may be of any conventional type known to a person skilled in the art.

According to an aspect of the invention, a flotation line 1 comprises a rougher part 1*a* with at least two rougher flotation cells 15*a* connected in series and arranged in fluid communication, and a scavenger part 1*b* with at least two scavenger flotation cells 15*b* connected in series and in fluid communication. A subsequent flotation cell is arranged to receive underflow 40 from a previous flotation cell. Overflow 50 from each flotation cell 15*a*, 15*b* is led out of the flotation line 1 into further treatment, for example regrinding, cleaning, conditioning or further flotation according to processes commonly known in the art.

At least one of the flotation cells in the flotation line 1 may be a froth flotation cell 10 according to this disclosure. Preferably, the at least one froth flotation cells 10 is arranged into a downstream end of the flotation line 1. In an embodiment, the scavenger part 1*b* comprises at least one froth flotation cell 10 according to this disclosure. Alternatively or additionally, the rougher part 1*a* of the flotation line 1 may comprise at least one froth flotation cell 10.

According to an embodiment, the flotation line 1 may comprise at least two rougher or scavenger flotation cells 15*a*, 15*b*, and/or at least two additional froth flotation cells 10*a*, 10*b* arranged to treat the slurry 1 before it is led into the froth flotation cell 10 (see FIG. 7*b*).

A froth flotation line 1 comprising at least one froth flotation cell 10 according to the present disclosure may be used in recovering mineral ore particles comprising a valuable mineral, especially but not necessarily from a low-grade ore. More specifically, the froth flotation line 1 may be used in recovering mineral ore particles comprising copper (Cu) from low grade ore. The amount of Cu may be as low as 0.1% by weight of the feed, i.e. infeed of slurry 100 into the flotation line.

In the froth flotation method for treating mineral ore particles suspended in slurry, the slurry 100 is separated into an underflow 40 and an overflow 50 in a froth flotation cell 10 according to the present disclosure. An open froth surface $A_f$ of a flotation tank 11 is divided into two open froth subsurfaces $A_{fa}$, $A_{fb}$ by a radial froth crowder 31 arranged between a first radial overflow lip 123*a* of a first radial froth collection launder 23*a* and a second radial overflow lip 123*a* of a second radial froth collection launder 23.

In an embodiment, the two open froth subsurfaces $A_{fa}$, $A_{fb}$ are completely separated by a radial froth crowder 31. According to another embodiment, the area of an open froth surface $A_f$ is varied so that the relationship between open froth subsurfaces $A_{fa}$, $A_{fb}$ between two radial froth collection launders 23*a*, 23*b* and an open froth subsurface ($A_{fc}$) inside the first overflow lip 122*a* of the second froth collection channel 22 is changed. According to an embodiment, the relationship between the two open froth subsurfaces $A_{fa}$, $A_{fb}$ separated by a radial froth crowder 31 is varied by changing the vertical position of the radial froth crowder 31 in relation to the height H of a radial froth overflow lip 123*a*, 123*b* next to the radial froth crowder 31.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A froth flotation cell for treating mineral ore particles suspended in slurry and for separating the slurry into an underflow and an overflow, the froth flotation cell comprising:

a tank with a center and a perimeter, a gas supply for introducing flotation gas into the slurry to form froth, a first froth collection channel surrounding the perimeter of the tank so that an open froth surface ($A_f$) is formed inside the first froth collection channel, a second froth collection channel arranged between the center of the tank and the first froth collection channel and substantially concentric with the first froth collection channel, the second froth collection channel comprising a first froth overflow lip defining an inner boundary of the second froth collection channel such that the first froth overflow lip is the closest portion of the second froth collection channel to the center of the tank, and a radial froth collection launder comprising a radial froth overflow lip, and extending from the first froth collection channel towards the second froth collection channel and in fluid communication with the first froth collection channel, the radial froth overflow lip arranged to allow overflow of the slurry and/or of the froth into the radial froth collection launder, wherein the froth flotation cell has a pulp area ($A_p$) of at least 15 $m^2$, measured at a height of a mixing area, defined as a part or a zone of a flotation tank in vertical direction where the slurry is agitated, and wherein the froth collected into the second froth collection channel is arranged to be directed to the first froth collection channel, wherein the froth flotation cell further comprises a radial froth crowder comprising a crowding sidewall, and extending from the second froth collection channel to the first froth collection channel, the crowding sidewall arranged to extend above the froth such that overflow of the froth into the radial froth crowder is prevented, wherein an upper edge of the radial froth crowder extends higher in the vertical direction than an upper edge of the second froth collection channel such that overflow of the froth into the first froth collection channel is permitted.

2. The froth flotation cell according to claim 1, wherein the radial froth overflow lip comprises a first radial froth overflow lip and a second radial froth overflow lip opposite the first radial froth overflow lip.

3. The froth flotation cell according to claim 1, wherein at least one radial froth overflow lip is arranged to face the crowding sidewall of the radial froth crowder.

4. The froth flotation cell according to claim 1, wherein the radial froth collection launder comprises a crowding sidewall.

5. The froth flotation cell according to claim 4, wherein the radial froth crowder comprises a froth collection lip opposite the crowding sidewall, and that the froth collection lip is arranged to face the crowding sidewall of the radial froth collection launder.

6. The froth flotation cell according to claim 1, wherein the crowding sidewall comprises a first crowding sidewall and a second crowding sidewall.

7. The flotation cell according to claim 1, wherein the radial froth collection launder comprises radial froth collection launders and/or the radial froth crowder comprises radial froth crowders arranged so that open froth surfaces ($A_f$) formed between each radial froth collection launder and/or radial froth crowder are identical in surface area.

8. The froth flotation cell according to claim 1, wherein the first froth collection channel comprises a first froth overflow lip facing towards the center of the tank.

9. The froth flotation cell according to claim 8, wherein the first froth overflow lip is arranged at the top of a vertical sidewall of the first froth collection channel.

10. The froth flotation cell according to claim 1, wherein the first froth collection channel comprises a side structure facing towards the center of the tank, the side structure arranged to crowd the froth away from the first froth collection channel.

11. The froth flotation cell according to claim 10, wherein the side structure has an angle of inclination of 20-80° in relation to a vertical (n) of the tank.

12. The froth flotation cell according to claim 1, wherein the second froth collection channel further comprises a second overflow lip facing towards the perimeter of the tank.

13. The froth flotation cell according to claim 12, wherein the second overflow lip is arranged at the top of a vertical sidewall of the second froth collection channel.

14. The froth flotation cell according to claim 1, wherein the second froth collection channel further comprises a side structure facing towards the perimeter of the tank, the side structure arranged to crowd the froth away from the second froth collection channel.

15. The froth flotation cell according to claim 14, wherein the side structure has an angle of inclination of 20-80° in relation to a vertical (n) of the tank.

16. The froth flotation cell according to claim 1, wherein the radial froth collection launder is arranged to collect the froth and direct a collected froth to the first froth collection channel.

17. The froth flotation cell according to claim 1, wherein the radial froth crowder is arranged in fluid communication with the first froth collection channel and the second froth collection channel, and further arranged to direct the froth from the second froth collection channel to the first froth collection channel.

18. The froth flotation cell according to claim 1, wherein the radial froth collection launder is arranged to have a shape that prevents flotation gas bubbles from colliding under the radial froth collection launder and the froth from moving away from the radial froth collection launder.

19. The froth flotation cell according to claim 1, wherein the second froth collection channel is shaped to direct the froth to flow in a direction from the center of the tank, radially outward, over the first froth overflow lip, and into the second froth collection channel.

20. The froth flotation cell according to claim 1, wherein the cross-section of the radial froth collection launder in a radial direction of the tank is a substantially V shaped form comprising an apex pointing towards a bottom of the tank, a first inclined sidewall (c) and a second inclined sidewall (d) extending from the apex so that an apex angle α is formed between the first and the second inclined sidewalls (c, d), and the radial froth overflow lip comprising a first radial froth overflow lip at the top of the first inclined sidewall (c) and a second radial froth overflow lip at the top of the second inclined sidewall (d).

21. The froth flotation cell according to claim 1, wherein the radial froth collection launder comprises a vertically extending first sidewall and a vertical extending second sidewall opposite the first sidewall, the radial froth overflow lip comprising a first radial froth overflow lip at the top of the first sidewall and a second radial froth overflow lip at the top of the second sidewall, and a substantially V shaped inclined bottom with an apex pointing towards a bottom of the tank and having an apex angle α, the first and second sidewalls and a bottom defining a channel for directing the froth to the first froth collection channel.

22. The froth flotation cell according to claim 21, wherein the first sidewall and the second sidewall have a length of at least 50 mm.

23. The froth flotation cell according to claim 19, wherein the angle α is 20-160°.

24. The froth flotation cell according to claim 1, wherein the radial froth crowder is arranged to have a shape that directs the froth towards the radial overflow lip of the radial froth collection launder next to the radial froth crowder.

25. The froth flotation cell according to claim 1, wherein the cross-section of the radial froth crowder in a radial direction of the tank has a functional V shape comprising an apex pointing towards a bottom of the tank, and an inclined first side (a) and an inclined second side (b) extending from the apex so that an angle β is formed between the first and the second sides (a, b).

26. The froth flotation cell according to claim 25, wherein the angle β is 20-80°.

27. The froth flotation cell according to claim 1, wherein a surface area ($A_C$) of the radial froth crowder is larger than a surface area ($A_L$) of the radial froth collection launder, measured at the height (H) of a froth surface.

28. The froth flotation cell according to claim 1, wherein the radial froth collection launder includes radial froth collection launders, and wherein the tank comprises open froth surfaces ($A_f$) between the first and second froth collection channels and the radial froth collection launders, and inside the second froth collection channel.

29. The froth flotation cell according to claim 28, wherein the open froth surface ($A_f$) between any two radial froth collection launders is dividable into two open froth subsurfaces ($A_{fa}$, $A_{fb}$) by the radial froth crowder, one open froth subsurface ($A_{fa}$) on the side of the radial froth overflow lip of the radial froth collection launder, and one open froth subsurface ($A_{fb}$) on the side of the second radial froth overflow lip of the second froth collection channel; so that the two open froth subsurfaces ($A_{fa}$, $A_{fb}$) are completely separated by the radial froth crowder.

30. The froth flotation cell according to claim 28, wherein the radial froth crowder is arranged to have a form which allows a froth load to be balanced between an open froth subsurface ($A_{fa}$) on a first side (a) of the functional V shape and an open froth subsurface ($A_{fb}$) on a second side (b) of the functional V shape.

31. The froth flotation cell according to claim 28, wherein an area of the open froth surface ($A_f$) is arranged to be varied so that a relationship between open froth subsurfaces ($A_{fa}$, $A_{fb}$) between the radial froth collection launders and an open froth subsurface ($A_{fc}$) inside a first overflow lip of the second froth collection channel is changed.

32. The froth flotation cell according to claim 28, wherein a relationship between two open froth subsurfaces ($A_{fa}$, $A_{fb}$) separated by the radial froth crowder is arranged to be varied by changing the vertical position of the radial froth crowder in relation to a height (H), measured from a bottom of the tank, of the radial froth overflow lip next to the radial froth crowder.

33. The froth flotation cell according to claim 1, wherein the gas supply is arranged into the tank.

34. The froth flotation cell according to claim 1, wherein the tank comprises a mixing device.

35. The froth flotation cell according to claim 34, wherein the mixing device comprises the gas supply.

36. The froth flotation cell according to claim 1, wherein the pulp area ($A_p$) is at least 40 $m^2$, measured at the mixing area.

37. The froth flotation cell according to claim 1, wherein the froth flotation cell has a volume of at least 150 $m^3$.

38. The froth flotation cell according to claim 1, wherein the radial froth collection launder is arranged to be supported by the second froth collection channel.

39. The froth flotation cell according to claim 1, wherein the radial froth collection launder comprises radial froth collection launders and the radial froth crowder includes radial froth crowders, and wherein an equal number of radial froth collection launders and radial froth crowders arranged alternately on a circumference surrounding the second froth collection channel; wherein the radial froth collection launders are arranged to be supported by the second froth collection channel.

40. The froth flotation cell according to claim 1, wherein the radial froth overflow lip comprises a straight radial froth overflow lip, or a zigzag radial froth overflow lip.

41. The froth flotation cell according to claim 40, wherein the radial froth overflow lip comprises the straight radial froth overflow lip.

42. A flotation line comprising a rougher part with at least two rougher flotation cells connected in series and arranged in fluid communication, and a scavenger part with at least two scavenger flotation cells connected in series and arranged in fluid communication, in which flotation line a subsequent flotation cell of the rougher or scavenger flotation cells is arranged to receive underflow from a previous flotation cell of the rougher or scavenger flotation cells, wherein at least one of the at least two scavenger flotation cells or at least two rougher flotation cells is a froth flotation cell according to claim 1.

43. The flotation line according to claim 42, wherein the scavenger part comprises at least one froth flotation cell.

44. The flotation line according to claim 42, wherein the rougher part comprises at least one froth flotation cell.

45. The flotation line according to claim 42, wherein the flotation line comprises at least two rougher flotation cells or scavenger flotation cells and/or at least two additional froth flotation cells arranged to treat the slurry before it is arranged to be treated in the froth flotation cell.

46. A froth flotation method for treating mineral ore particles suspended in slurry, wherein the slurry is separated into an underflow and an overflow in a froth flotation cell according to claim 1, wherein the radial froth overflow lip comprises a first radial froth overflow lip and a second radial froth overflow lip, and wherein the radial froth collection launder comprises a first radial froth collection launder with a first radial overflow lip and a second radial froth collection launder with a second radial overflow lip, and an open froth surface ($A_f$) of the flotation tank is divided into two open froth subsurfaces ($A_{fa}$, $A_{fb}$) by the radial froth crowder arranged between the first radial overflow lip of the first radial froth collection launder and the second radial overflow lip of the second radial froth collection launder, one open froth subsurface ($A_{fa}$) on the side of the first radial froth overflow lip and one open froth subsurface ($A_{fa}$) on the side of the second radial froth overflow lip; so that the two open froth subsurfaces ($A_{fa}$, $A_{fb}$) are completely separated by the radial froth crowder.

47. The froth flotation method according to claim 46, wherein the two open froth subsurfaces ($A_{fa}$, $A_{fb}$) are completely separated by the radial froth crowder.

48. The froth flotation method according to claim 46, wherein an area of an open froth surface ($A_f$) is varied so that a relationship between open froth subsurfaces ($A_{fa}$, $A_{fb}$) between the first and second radial froth collection launders and an open froth subsurface ($A_{fc}$) inside a first overflow lip of the second froth collection channel is changed.

49. The froth flotation method according to claim 46, wherein a relationship between the two open froth subsurfaces ($A_{fa}$, $A_{fb}$) separated by the radial froth crowder is varied by changing a vertical position of the radial froth crowder in relation to a height (H) of the radial froth overflow lip next to the radial froth crowder.

50. The froth flotation cell according to claim 1, wherein the first froth overflow lip is ring-shaped.

51. A froth flotation cell for treating mineral ore particles suspended in slurry and for separating the slurry into an underflow and an overflow, the froth flotation cell comprising:

a tank with a center and a perimeter;

a first froth collection channel surrounding the perimeter of the tank so that an open froth surface ($A_f$) is formed inside the first froth collection channel;

a second froth collection channel arranged between the center of the tank and the first froth collection channel and substantially concentric with the first froth collection channel, the second froth collection channel comprising a first froth overflow lip defining an inner boundary of the second froth collection channel such that the first froth overflow lip is the closest portion of the second froth collection channel to the center of the tank;

a radial froth collection launder comprising a radial froth overflow lip, and extending from the first froth collection channel towards the second froth collection channel and in fluid communication with the first froth collection channel, the radial froth overflow lip arranged to allow overflow of the slurry and/or of the froth into the radial froth collection launder; and a radial froth crowder comprising a crowding sidewall and extending from the second froth collection channel to the first froth collection channel, the crowding sidewall arranged to extend above the froth such that overflow of the froth into the radial froth crowder is prevented, wherein the froth collected into the second froth collection channel is arranged to be directed to the first froth collection channel, and wherein an upper edge of the radial froth crowder extends higher in a vertical direction than an upper edge of the second froth collection channel such that overflow of the froth into the first froth collection channel is permitted.

52. The froth flotation cell according to claim 51, wherein the first froth overflow lip is ring-shaped.

* * * * *